(12) United States Patent
Suzuki

(10) Patent No.: US 11,190,952 B2
(45) Date of Patent: Nov. 30, 2021

(54) SETTING BEAM DIRECTION FOR A MOBILE TERMINAL AND A FLYING OBJECT

(71) Applicant: Mitsubishi Electric Corporation, Chiyoda-ku (JP)

(72) Inventor: Kuniyuki Suzuki, Tokyo (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 16/640,842

(22) PCT Filed: Aug. 23, 2018

(86) PCT No.: PCT/JP2018/031058
§ 371 (c)(1),
(2) Date: Feb. 21, 2020

(87) PCT Pub. No.: WO2019/044635
PCT Pub. Date: Mar. 7, 2019

(65) Prior Publication Data
US 2021/0099893 A1  Apr. 1, 2021

(30) Foreign Application Priority Data
Aug. 31, 2017 (JP) .............................. JP2017-166529

(51) Int. Cl.
*H04W 16/26* (2009.01)
*H04W 76/15* (2018.01)
(Continued)

(52) U.S. Cl.
CPC .............. *H04W 16/26* (2013.01); *H04B 7/06* (2013.01); *H04B 7/185* (2013.01); *H04W 16/32* (2013.01); *H04W 72/04* (2013.01); *H04W 76/15* (2018.02)

(58) Field of Classification Search
CPC ..... H04W 16/26; H04W 76/15; H04W 16/32; H04W 72/04; H04W 36/32; H04W 84/06;
(Continued)

(56) References Cited

U.S. PATENT DOCUMENTS 8,442,519 B2 * 5/2013 Cruz .................. H04B 7/18508
455/431
2009/0181621 A1 7/2009 Kimura
(Continued)

FOREIGN PATENT DOCUMENTS

GB          2532966 A       6/2016
JP      2003-348004 A      12/2003
(Continued)

OTHER PUBLICATIONS

International Search Report dated Nov. 6, 2018 in PCT/JP2018/031058 filed on Aug. 23, 2018, 5 pages.
(Continued)

*Primary Examiner* — Afshawn M Towfighi
(74) *Attorney, Agent, or Firm* — Oblon, McClelland, Maier & Neustadt, L.L.P.

(57) ABSTRACT

The present disclosure has an object to provide a specific communication technology for realizing effective communication with a flying object in a communication apparatus including the flying object. The communication apparatus includes a first base station, a flying object including a second base station, and a mobile terminal to communicate with the second base station. The first base station notifies flying object specification information that is information indicating that the second base station is included in the flying object. When the flying object specification information is received, the mobile terminal sets a direction of a beam for detecting the second base station to a second direction that is a direction vertically upward compared to a
(Continued)

first direction that is the direction of the beam in a case where the flying object specification information is not received.

6 Claims, 19 Drawing Sheets

(51) Int. Cl.
*H04B 7/06* (2006.01)
*H04B 7/185* (2006.01)
*H04W 16/32* (2009.01)
*H04W 72/04* (2009.01)

(58) Field of Classification Search
CPC ..... H04W 16/28; H04W 16/22; H04W 76/14; H04B 7/06; H04B 7/185; H04B 7/18504; H04B 7/18506; H04B 7/088; H04B 7/0695; B64C 39/024
See application file for complete search history.

(56) References Cited

U.S. PATENT DOCUMENTS

| | | |
|---|---|---|
| 2011/0182230 A1 | 7/2011 | Ohm et al. |
| 2012/0056784 A1* | 3/2012 | Xie .................. H01Q 1/28 342/359 |
| 2014/0266896 A1* | 9/2014 | Hyslop .............. H04B 7/18506 342/368 |
| 2015/0236778 A1* | 8/2015 | Jalali .................. H04W 84/06 370/316 |
| 2016/0380692 A1 | 12/2016 | Jalali et al. |
| 2019/0260462 A1* | 8/2019 | Axmon ............... H04B 7/2041 |

FOREIGN PATENT DOCUMENTS

| | | |
|---|---|---|
| JP | 2009-165090 A | 7/2009 |
| JP | 2010-50804 A | 3/2010 |
| JP | 2012-502527 A | 1/2012 |
| WO | WO 2010/025997 A1 | 3/2010 |

OTHER PUBLICATIONS

3GPP TS 36.300 V13.0.0, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13), Jun. 2015 (total 254 pages).
3GPP TSG-SA1 #42, S1-083461, "LS on HNB/HeNBOpen Access Mode," Seoul, South Korea, Oct. 2008 (total 2 pages).
3GPP TR 36.814 V9.0.0, 3rd Generation Partnership Project; Technical Specification Group Radio Access Network; Evolved Universal Terrestrial Radio Access (E-UTRA); Further advancements for E-UTRA physical layer aspects (Release 9), Mar. 2010 (total 104 pages).
3GPP TR 36.912 V10.0.0, 3rd Generation Partnership Project; Technical Specification Group Radio Access Network; Feasibility study for Further Advancements for E-UTRA (LTE-Advanced), (Release 10), Mar. 2011 (total 252 pages).
Document No. ICT-317669-METIS/D1.1, Project Name: Mobile and wireless communications Enablers for the Twenty-twenty Information Society (METIS), Deliverable D1.1, Scenarios, requirements and KPIs for 5G mobile and wireless system, METIS, Seventh Framework Programme, Apr. 2013 (total 84 pages).
3GPP TR 36.897 V13.0.0, 3rd Generation Partnership Project; Technical Specification Group Radio Access Network; Study on elevation beamforming / Full-Dimension (FD) Multiple Input Multiple Output (MIMO) for LTE (Release 13), Jun. 2015 (total 200 pages).
Extended European Search Report dated May 3, 2021 in corresponding European Patent Application No. 18851140.6, 11 pages.

* cited by examiner

|  | 1ST TIME | 2ND TIME | 3RD TIME | 4TH TIME | 5TH TIME |
|---|---|---|---|---|---|
| TILT ANGLE | 15° | 13° | 11° | 9° | 9° |
| BASE STATION RESPONSE | NONE | NONE | NONE | RECEIVED | — |

FIG. 15

|  | 1ST TIME | 2ND TIME | 3RD TIME | 4TH TIME | 5TH TIME |
|---|---|---|---|---|---|
| TRANSMISSION POWER | 0dB | +3dB | +6dB | +9dB | +9dB |
| BASE STATION RESPONSE | NONE | NONE | NONE | RECEIVED | — |

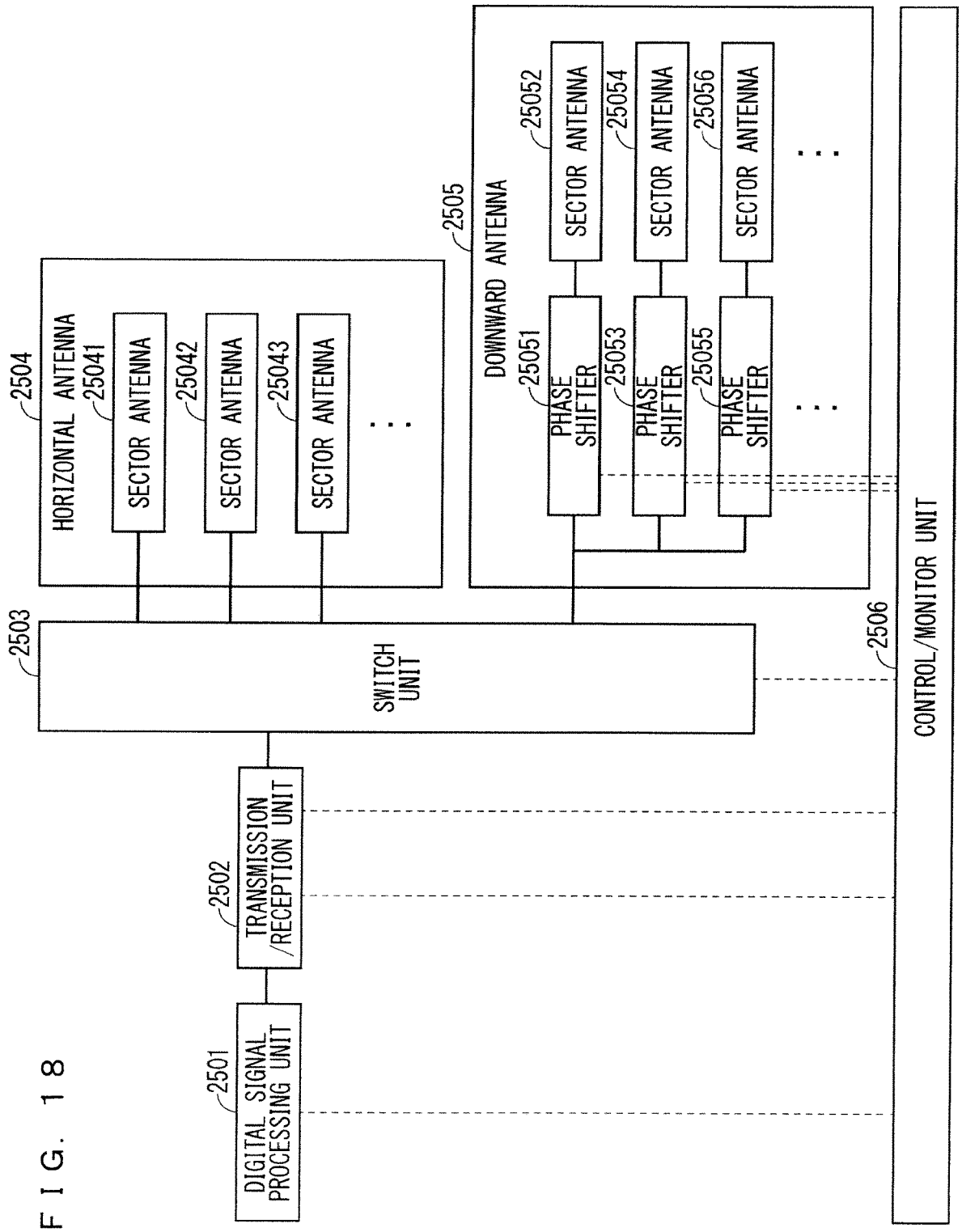
F I G. 1 8

SETTING BEAM DIRECTION FOR A MOBILE TERMINAL AND A FLYING OBJECT

TECHNICAL FIELD

The technology disclosed in the specification of the present application relates to a communication apparatus that performs wireless communication.

BACKGROUND ART

In the 3rd Generation Partnership Project (3GPP), a standardization organization for mobile communication systems, the wireless section is referred to as Long Term Evolution (LTE), and a communication method called System Architecture Evolution (SAE) has been studied as an entire communication system including a core network and a wireless access network (hereinafter collectively referred to as the network) (for example, Non-Patent Documents 1 to 4). This communication method is also called a 3.9th generation (3.9G) system.

As an LTE access scheme, orthogonal frequency division multiplexing (OFDM) is used in a downlink direction, and single carrier frequency division multiple access (SC-FDMA) is used in an uplink direction. Also, different from wideband code division multiple access (W-CDMA), LTE does not include circuit switching and only a packet communication method is performed.

Non-Patent Document 1 (Chapter 5) describes decisions regarding a frame configuration in the LTE system in 3GPP. One radio frame is 10 ms. The radio frame is divided into ten equally sized subframes. The subframe is divided into two equally sized slots. A downlink synchronization signal is included in the first and sixth subframes for each radio frame. The synchronization signal includes a primary synchronization signal (P-SS) and a secondary synchronization signal (S-SS).

Non-Patent Document 1 (Chapter 5) describes the decisions regarding the channel configuration in the LTE system in 3GPP. It is assumed that a closed subscriber group (CSG) cell uses the same channel configuration as a non-CSG cell.

A physical broadcast channel (PBCH) is a channel for downlink transmission from a base station device (hereinafter sometimes simply referred to as "base station") to a communication terminal device (hereinafter sometimes simply referred to as "communication terminal") such as a mobile terminal device (hereinafter sometimes simply referred to as "mobile terminal"). A BCH transport block is mapped to four subframes with 40 ms intervals. There is no obvious signaling of 40 ms timing.

A physical control format indicator channel (PCFICH) is a channel for downlink transmission from a base station to a communication terminal. The PCFICH broadcasts the number of orthogonal frequency division multiplexing (OFDM) symbols used for PDCCHs from the base station to the communication terminal. The PCFICH is transmitted for each subframe.

The physical downlink control channel (PDCCH) is a channel for downlink transmission from the base station to the communication terminal. The PDCCH broadcasts resource allocation information of a downlink shared channel (DL-SCH), which is one of transport channels described later, and resource allocation information of a paging channel (PCH), which is one of transport channels described later, and hybrid automatic repeat request (HARQ) information related to the DL-SCH. The PDCCH carries an uplink scheduling grant. The PDCCH carries Acknowledgement (Ack)/Negative Acknowledgement (Nack) which is a response signal to uplink transmission. The PDCCH is also called an L1/L2 control signal.

A physical downlink shared channel (PDSCH) is a channel for downlink transmission from a base station to a communication terminal. A downlink shared channel (DL-SCH) that is a transport channel and PCH that is a transport channel are mapped to the PDSCH.

A physical multicast channel (PMCH) is a channel for downlink transmission from a base station to a communication terminal. A multicast channel (MCH) that is a transport channel is mapped to the PMCH.

A physical uplink control channel (PUCCH) is a channel for uplink transmission from a communication terminal to a base station. The PUCCH carries Ack/Nack, which is a response signal for downlink transmission. The PUCCH carries a channel quality indicator (CQI) report. The CQI is quality information indicating quality of received data or channel quality. The PUCCH carries a scheduling request (SR).

A physical uplink shared channel (PUSCH) is a channel for uplink transmission from a communication terminal to a base station. An uplink shared channel (UL-SCH), which is one of the transport channels, is mapped to the PUSCH.

A physical hybrid ARQ indicator channel (PHICH) is a channel for downlink transmission from a base station to a communication terminal. The PHICH carries Ack/Nack, which is a response signal for the uplink transmission. A physical random access channel (PRACH) is a channel for the uplink transmission from a communication terminal to a base station. The PRACH carries a random access preamble.

A downlink reference signal (RS) is a symbol known as an LTE communication system. Following five types of downlink reference signals are defined: a cell-specific reference signal (CRS), an MBSFN reference signal, a data demodulation reference signal (DM-RS), which is a mobile terminal specific reference signal (UE-specific reference signal), a positioning reference signal (PRS), and a channel state information reference signal (CSI-RS). As a measurement of the physical layer of the communication terminal, there is a reference signal received power (RSRP) measurement.

A transport channel described in Non-Patent Document 1 (Chapter 5) will be described. In the downlink transport channels, a broadcast channel (BCH) is broadcast over the entire coverage of the base station (cell). The BCH is mapped to a physical broadcast channel (PBCH).

Retransmission control by Hybrid ARQ (HARQ) is applied to the downlink shared channel (DL-SCH). The DL-SCH can be broadcast to the entire coverage of the base station (cell). The DL-SCH supports dynamic or semi-static resource allocation. The semi-static resource allocation is also called persistent scheduling. The DL-SCH supports discontinuous reception (DRX) of a communication terminal in order to reduce power consumption of the communication terminal. The DL-SCH is mapped to the physical downlink shared channel (PDSCH).

The paging channel (PCH) supports DRX of the communication terminal in order to enable low power consumption of the communication terminal. The PCH is required to broadcast to the entire coverage of the base station (cell). The PCH is mapped to a physical resource such as a physical downlink shared channel (PDSCH) that can be dynamically used for traffic.

A multicast channel (MCH) is used for broadcast to the entire coverage of a base station (cell). The MCH supports SFN combining of multimedia broadcast multicast service (MBMS) services (MTCH and MCCH) in multi-cell transmission. The MCH supports the semi-static resource allocation. The MCH is mapped to the PMCH.

In the uplink transport channels, retransmission control using Hybrid ARQ (HARQ) is applied to an uplink shared channel (UL-SCH). The UL-SCH supports the dynamic or semi-static resource allocation. The UL-SCH is mapped to a physical uplink shared channel (PUSCH).

A random access channel (RACH) is limited to control information. The RACH has risk of collision. The RACH is mapped to a physical random access channel (PRACH).

The HARQ will be explained. The HARQ is a technique for improving the communication quality of a transmission path by combining automatic repeat request (ARQ) and error correction (forward error correction). The HARQ has an advantage that error correction functions effectively by retransmission even for a transmission path whose communication quality changes. In particular, it is possible to further improve the quality by combining the reception result of the initial transmission and the reception result of the retransmission during the retransmission.

An example of the retransmission method will be described. When the reception side cannot decode the received data correctly, in other words, when a cyclic redundancy check (CRC) error occurs (CRC=NG), "Nack" is transmitted from the reception side to the transmission side. The transmission side that has received "Nack" retransmits the data. When the reception side can correctly decode the received data, in other words, when no CRC error occurs (CRC=OK), "Ack" is transmitted from the reception side to the transmission side. The transmitting side that has received "Ack" transmits next data.

A logical channel described in Non-Patent Document 1 (Chapter 6) will be described. A broadcast control channel (BCCH) is a downlink channel for broadcast system control information. The BCCH that is a logical channel is mapped to a broadcast channel (BCH) that is a transport channel or a downlink shared channel (DL-SCH).

A paging control channel (PCCH) is a downlink channel for transmitting changes in paging information and system information. The PCCH is used when the network does not recognize the cell location of the communication terminal. The PCCH that is a logical channel is mapped to a paging channel (PCH) that is a transport channel.

The common control channel (CCCH) is a channel for transmission control information between the communication terminal and the base station. The CCCH is used when the communication terminal does not have an RRC connection with the network. In the downlink direction, the CCCH is mapped to a downlink shared channel (DL-SCH) that is a transport channel. In the uplink direction, the CCCH is mapped to an uplink shared channel (UL-SCH) that is a transport channel.

A multicast control channel (MCCH) is a downlink channel for one-to-many transmission. The MCCH is used for transmitting MBMS control information for one or more MTCHs from the network to the communication terminal. The MCCH is used only for communication terminals which are receiving MBMS. The MCCH is mapped to a multicast channel (MCH) that is a transport channel.

A dedicated control channel (DCCH) is a channel for transmitting dedicated control information between a communication terminal and a network on a one-to-one basis. The DCCH is used when the communication terminal is an RRC connection. The DCCH is mapped to the uplink shared channel (UL-SCH) in the uplink, and is mapped to the downlink shared channel (DL-SCH) in the downlink.

A dedicated traffic channel (DTCH) is a channel for one-to-one communication to an individual communication terminal for transmitting user information. The DTCH exists for both upstream and downstream. The DTCH is mapped to the uplink shared channel (UL-SCH) in the uplink, and is mapped to the downlink shared channel (DL-SCH) in the downlink.

A multicast traffic channel (MTCH) is a downlink channel for transmitting traffic data from the network to the communication terminal. The MTCH is a channel used only for communication terminals which are receiving MBMS. The MTCH is mapped to a multicast channel (MCH).

CGI stands for a cell global identifier. ECGI is an E-UTRAN Cell Global Identifier. The closed subscriber group (CSG) cells are introduced in LTE, later described long term evolution advanced (LTE-A) and universal mobile telecommunication system (UMTS).

The closed subscriber group (CSG) cell is a cell in which an operator identifies an available subscriber (hereinafter, sometimes referred to as a "specific subscriber cell"). The identified subscriber is allowed to access one or more cells of the public land mobile network (PLMN). One or more cells to which the identified subscribers are allowed to access are called "CSG cells (CSG cells (s))". However, the PLMN has access restrictions.

The CSG cell is a part of a PLMN that broadcasts a unique CSG identity (CSG ID; CSG-ID) and broadcasts "TRUE" in CSG indication. The allowed members of the subscriber group who have been registered for use in advance access the CSG cell using the CSG-ID that is the access permission information.

The CSG-ID is broadcast by the CSG cell or cell. There are a plurality of CSG-IDs in an LTE communication system. Then, the CSG-ID is used by the mobile terminal (UE) to facilitate access of CSG related members.

The position tracking of the communication terminal is performed in units of areas composed of one or more cells. The position tracking is performed to track the position of the communication terminal and call the communication terminal even in a standby state, in other words, to enable the communication terminal to receive a call. This area for tracking the position of the communication terminal is called a tracking area.

In 3GPP, base stations called Home-NodeB (Home-NB, HNB) and Home-eNodeB (Home-eNB, HeNB) are being studied. The HNB in UTRAN and the HeNB in E-UTRAN are, for example, base stations for home, corporate, and commercial access services. Non-Patent Document 2 discloses three different modes of access to HeNB and HNB. More specifically, an open access mode, a closed access mode, and a hybrid access mode are disclosed.

In 3GPP, as a release 10, the development of a long term evolution advanced (LTE-A) standard has been proceeded (see Non-Patent Documents 3 and 4). The LTE-A is based on the LTE wireless communication system, and is configured by adding several new technologies.

In the LTE-A system, carrier aggregation (CA) that aggregates two or more component carriers (CC) (also referred to as "aggregation") to support wider transmission bandwidths up to 100 MHz is being studied. The CA is described in Non-Patent Document 1.

When the CA is configured, the mobile terminal has a network (NW) and only one RRC connection. In the RRC connection, one serving cell provides NAS mobility information and security input. This cell is called a primary cell (PCell). In downlink, a carrier corresponding to the PCell is a downlink primary component carrier (DL PCC). The carrier corresponding to the PCell in the uplink is an uplink primary component carrier (UL PCC).

Depending on the capability of the mobile terminal, a secondary cell (SCell) is configured to form a set of the PCell and a serving cell. In the downlink, a carrier corresponding to the SCell is a downlink secondary component carrier (DL SCC). In uplink, a carrier corresponding to SCell is an uplink secondary component carrier (UL SCC).

A set of one PCell and a serving cell including one or more SCells is configured for one mobile terminal.

Also, new technologies in LTE-A include a technology that supports a wider bandwidth (wider bandwidth extension), and a coordinated multiple point transmission and reception (CoMP) technology. Non-Patent Document 1 describes CoMP being studied for LTE-A by 3GPP.

The amount of mobile network traffic is increasing and the communication speed is also increasing. When LTE and LTE-A are fully operational, the communication speed is expected to be further increased.

In 3GPP, in order to cope with future enormous traffic, use of a small eNB (hereinafter sometimes referred to as a "small base station apparatus") that constitutes a small cell is being considered. For example, a technique for increasing frequency utilization efficiency and increasing communication capacity by installing a large number of small eNBs and configuring a large number of small cells has been studied. More specifically, there is dual connectivity (abbreviation: DC) in which a mobile terminal connects to two eNBs for communication. The DC is described in Non-Patent Document 1.

Of the eNBs that perform the dual connectivity (DC), one may be referred to as "master eNB (abbreviation: MeNB)" and the other may be referred to as "secondary eNB (abbreviation: SeNB)" in some cases.

Furthermore, a fifth generation (hereinafter, sometimes referred to as "G") wireless access system that aims to start a service after 2020 for mobile communication that is becoming more sophisticated is being studied. For example, in Europe, 50 requirements are being compiled by an organization called METIS (see Non-Patent Document 5).

In the 5G wireless access system, the system capacity is made 1000 times larger, the data transmission speed is made 100 times faster, the data processing delay is made one-tenth (1/10), and the number of simultaneous connections of communication terminals is made 100 times more than the LTE system so that, further reduction in power consumption and reduction in cost of the apparatus are mentioned as requirements.

In order to satisfy such requirements, it has been studied to increase the data transmission capacity by using the frequency in a wide band and to increase the data transmission speed by increasing the frequency utilization efficiency. In order to realize these, techniques such as a multiple input multiple output (MIMO) using a multi-element antenna and beam forming that enable spatial multiplexing have been studied.

In LTE-A, MIMO is still being studied and, as an extension of MIMO, Full Dimension (FD)-MIMO using a two-dimensional antenna array has been studied from Release 13. The FD-MIMO is described in Non-Patent Document 6.

The 5G wireless access system is considered to be mixed with the LTE system at the beginning of the service scheduled for 2020. By connecting the LTE base station and 50 base station in DC configuration and using the LTE base station as an MeNB and the 5G base station as an SeNB, a configuration has been considered in which C-plane data is processed in the LTE base station with large cell range and U-plane processing is performed by the LTE base station and the 5G base station.

PRIOR ART DOCUMENTS

Non-Patent Documents

Non-Patent Document 1: 30PP TS36.300 V13.0.0
Non-Patent Document 2: 3GPP S1-083461
Non-Patent Document 3: 30PP TR 36.814 V9.0.0
Non-Patent Document 4: 3GPP TR 36.912 V10.0.0
Non-Patent Document 5: "Scenarios, requirements and KPIs for 5G mobile and wireless system", [online], Apr. 30, 2013, ICT-317669-METIS/D1.1, [Searched on Jan. 25, 2016], the Internet link https://www.metis2020.com/documents/deliverables/
Non-Patent Document 6: 3GPP TR 36.897 V13.0.0

SUMMARY

Problems to be Solved by the Invention

In recent years, mobile communication using a flying object such as a drone has begun to be discussed; however, there is a problem that a base station cannot communicate with a flying object at high altitude since an antenna of the base station has directivity of a transmission/reception beam slightly downward from the horizontal direction using a technique such as tilting and the like in general.

In particular, it is effective to use an active phased array antenna (APAA) as one of the important technologies for broadband communication at high frequencies; however, there has been a problem that, in APAA, there is no method for establishing, maintaining, and releasing communication with the directivity of the transmission/reception beam set in a proper direction in consideration of the communication with the flying object.

In addition, it is also assumed that the flying object is used in an environment where there are no obstacles in the vicinity and the line of sight is good; however, in this case, the flying object may become a source that causes interference.

For example, when a flying object is provided with the same function as that of a conventional mobile terminal, all transmission signals from the mobile terminal may be interference sources for other mobile terminals under the condition without any obstacle.

Further, in a case where the mobile terminal is located in the sky, a propagation loss equivalent to that in free space is considered. In other words, the propagation loss is proportional to the square of the propagation distance. In general, the propagation loss in a city or the like is proportional to the 3.5th power of the propagation distance, so that the propagation loss is reduced and the signal is propagated farther. For this reason, it is conceivable that the influence of interference extends to a neighboring cell or a next neighboring cell depending on the situation.

However, in the current mobile communication system, there is a problem that there is no specific method for establishing, maintaining, and releasing communication to reduce interference generated in communication with a flying object.

The technology disclosed in the present specification has been made in order to solve the above described problems and has an object to provide a specific communication technology that realizes efficient communication with a flying object in a communication apparatus including the flying object.

Means to Solve the Problem

A first aspect of the technology disclosed in the specification of the present application includes a first base station, a flying object including a second base station, and a mobile terminal to communicate with the second base station. The first base station notifies flying object specification information that is information indicating that the second base station is included in the flying object. When the flying object specification information is received, the mobile terminal sets a direction of a beam for detecting the second base station to a second direction that is a direction vertically upward compared to a first direction that is the direction of the beam in a case where the flying object specification information is not received.

The second aspect of the technology disclosed in the specification of the present application includes a first base station, and a flying object corresponding to a mobile terminal that communicates with the first base station. The mobile terminal sets a direction of a transmission/reception beam for communicating with the first base station to a direction which is shifted by a tilt angle from a direction toward the first base station.

The third aspect of the technology disclosed in the specification of the present application includes a first base station, and a flying object corresponding to a mobile station that communicates with the first base station. In communication with the first base station, the mobile terminal sets transmission power for the communication larger when the response time of the first base station is longer.

The fourth aspect of the technology disclosed in the specification of the present application includes a first base station, a mobile terminal to communicate with the first base station in a cell to which the first base station belongs, and a second base station belonging to a cell different from the cell of the first base station. At least one of the first base station, the mobile terminal, and the second base station corresponds to a flying object. The mobile terminal performs a handover from the first base station to the second base station based on at least a distance from the first base station and a distance from the second base station.

Further, a fifth aspect of the technology disclosed in the specification of the present application includes a first base station, and a mobile terminal whose vertical direction is prescribed and configured to communicate with the first base station. The mobile terminal sets a direction of a transmission/reception beam for communicating with the first base station to a direction shifted from a direction toward the first base station by a tilt angle.

Effects of the Invention

A first aspect of the technology disclosed in the specification of the present application includes a first base station, a flying object including a second base station, and a mobile terminal to communicate with the second base station. The first base station notifies flying object specification information that is information indicating that the second base station is included in the flying object. When the flying object specification information is received, the mobile terminal sets a direction of a beam for detecting the second base station to a second direction that is a direction vertically upward compared to a first direction that is the direction of the beam in a case where the flying object specification information is not received. According to such a configuration, a direction of a beam for detecting the second base station can be set upward in the mobile terminal based on the flying object specification information even when the flying object located in a direction with a large elevation angle is equipped with the second base station. Therefore, the mobile terminal can detect the base station which is even provided in the flying object.

The second aspect of the technology disclosed in the specification of the present application includes a first base station, and a flying object corresponding to a mobile terminal that communicates with the first base station. The mobile terminal sets a direction of a transmission/reception beam for communicating with the first base station to a direction which is shifted by a tilt angle from a direction toward the first base station. According to such a configuration, since the propagation distance of the signal is shortened, transmission power from the flying object can be suppressed from being transmitted outside the cell area. Therefore, signal interference to other cells caused by the mobile terminal corresponding to the flying object can be suppressed.

The third aspect of the technology disclosed in the specification of the present application includes a first base station, and a flying object corresponding to a mobile station that communicates with the first base station. In communication with the first base station, the mobile terminal sets transmission power for the communication larger when the response time of the first base station is longer. According to such a configuration, it is possible to find transmission power that can propagate a signal from a mobile terminal to a base station and can suppress signal interference to other cells as much as possible.

The fourth aspect of the technology disclosed in the specification of the present application includes a first base station, a mobile terminal to communicate with the first base station in a cell to which the first base station belongs, and a second base station belonging to a cell different from the cell of the first base station. At least one of the first base station, the mobile terminal, and the second base station corresponds to a flying object. The mobile terminal performs a handover from the first base station to the second base station based on at least a distance from the first base station and a distance from the second base station. According to such a configuration, since handover is performed based on the distance between the base station and the mobile terminal, it is possible to prevent the handover from being excessively limited due to the signal propagating farther in a case where at least one of the first base station, the mobile terminal, and the second base station is a flying object.

Further, a fifth aspect of the technology disclosed in the specification of the present application includes a first base station, and a mobile terminal whose vertical direction is prescribed and configured to communicate with the first base station. The mobile terminal sets a direction of a transmission/reception beam for communicating with the first base station to a direction shifted from a direction toward the first base station by a tilt angle. According to such a configuration, since the propagation distance of the signal is shortened, transmission power from the mobile terminal can be suppressed from being transmitted outside the cell area. Therefore, signal interference to other cells due to the mobile terminal can be suppressed.

The objects, features, aspects and advantages of the technology disclosed in the present specification will become more apparent from the detailed description given below and the accompanying drawings.

BRIEF DESCRIPTION OF DRAWINGS

FIG. 15 is a diagram illustrating a transition of the transmission power control according to a response from the base station.

FIG. 18 is a functional block diagram conceptually illustrating a configuration of a mobile terminal.

DESCRIPTION OF EMBODIMENTS

In the following, embodiments will be described with reference to the attached drawings.

Note that the drawings are schematically illustrated, and some configurations may be omitted or some configurations may be simplified as appropriate for the convenience of description. In addition, the interrelationships among sizes and positions of configurations and the like illustrated in different drawings are not necessarily accurately described, and may be changed as appropriate.

Moreover, in the description given below, same components are applied with same reference signs and illustrated with same reference signs, and the components applied with same reference signs are assumed to have same names and functions. Thus, detailed descriptions about those components may be omitted to avoid duplication.

Also, in the description described below, some words that indicate specific positions and directions such as "upper", "lower", "left", "right", "side", "bottom", "front" or "back" are used; however, these terms are used for the sake of convenience to facilitate understanding of the contents of the embodiments, and are not related to the directions in actual implementation.

In addition, in the description described below, some ordinal numbers such as "first" or "second" are used; however, these terms are used for the sake of convenience to facilitate understanding of the contents of the embodiments, and do not set any limitation with an order or the like made by those ordinal numbers.

The technique disclosed in this description is effective at least in the following cases. The cases here includes a case where a mobile terminal is mounted in a flying object, a case where the flying object itself is a mobile terminal, a case where the base station (SeNB) is a flying object, a case where the base station (MeNB+SeNB) is a flying object, a case where a repeater is a flying object, and a case of a D2D (relay using a mobile terminal (using PC5)).

First Embodiment

<Configuration of Communication Apparatus>

In the following, the communication apparatus according to the present embodiment will be described. This embodiment describes a case where a base station (SeNB) is a flying object.

Figure 1:
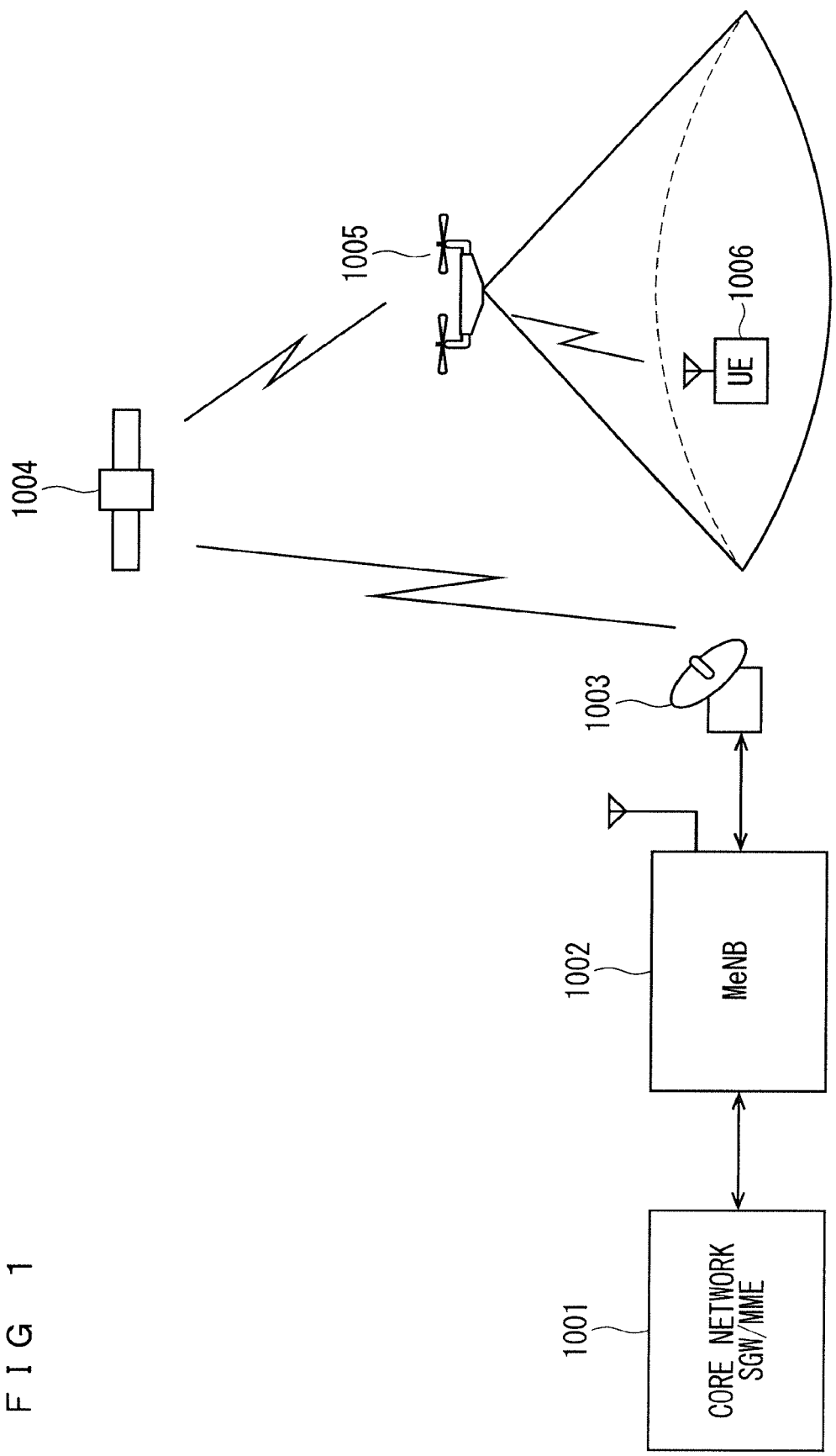
FIG. 1 is a diagram schematically illustrating a configuration of a communication apparatus according to an embodiment.

For example, when a temporary increase of radio traffic is predicted, it is effective to provide a base station (SeNB) in a flying object. In this case, as illustrated in FIG. 1, the connection between an MeNB and an SeNB is established using a line such as a satellite line, and communication between the flying object including the SeNB and a core network is established. Alternatively, as illustrated in FIG. 2, the MeNB-SeNB connection is performed using time, frequency, code, or space, which is not being used for the mobile terminal, to establish communication between the flying object and the core network.

Here, FIG. 1 is a diagram schematically illustrating a configuration of a communication apparatus according to the present embodiment. As illustrated in FIG. 1, the communication apparatus includes a core network 1001, an MeNB 1002, a ground station 1003, an artificial satellite 1004, a flying object 1005, and a mobile terminal 1006.

Figure 2:
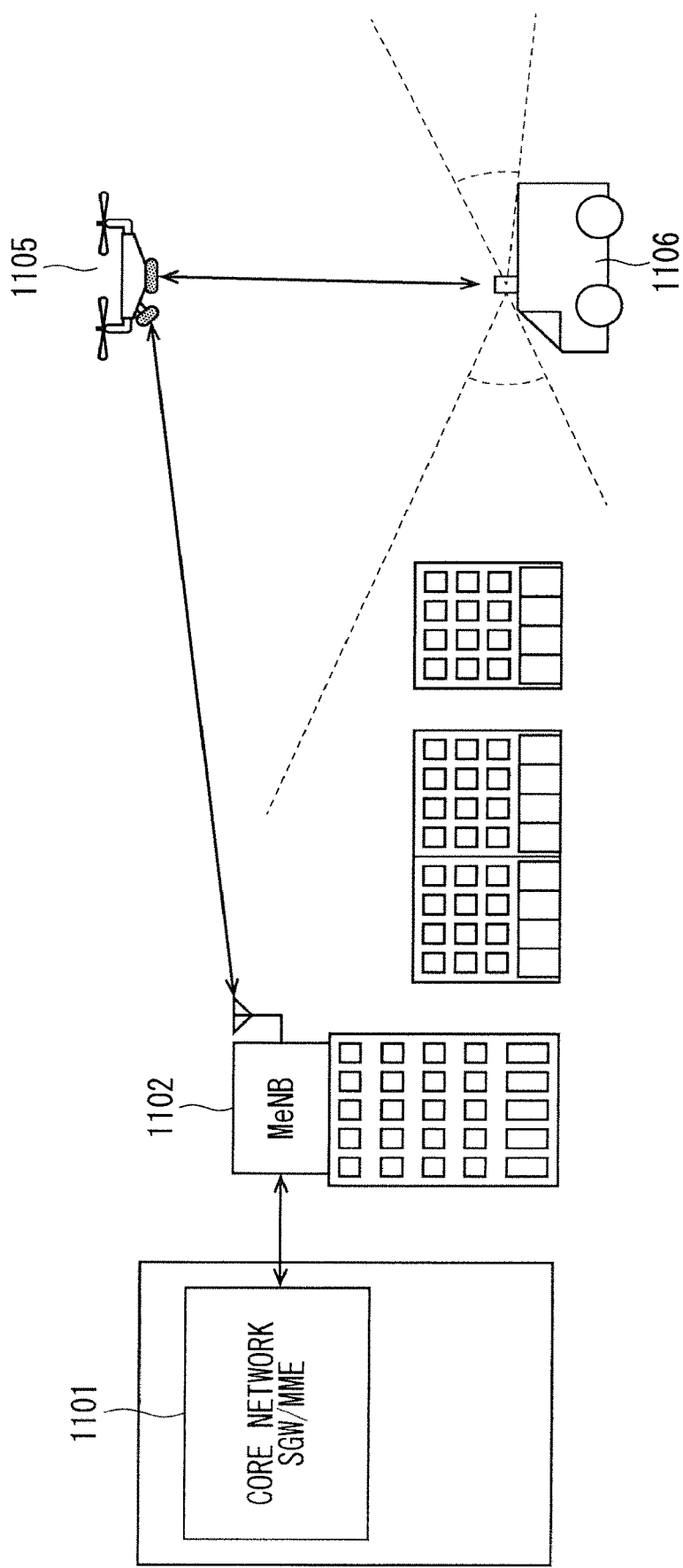
FIG. 2 is a diagram schematically illustrating another configuration of the communication apparatus.

FIG. 2 is a diagram schematically illustrating another configuration of the communication apparatus according to the present embodiment. As illustrated in FIG. 2, the communication apparatus includes a core network 1101, an MeNB 1102, a flying object 1105, and a mobile terminal 1106 such as a vehicle.

In FIG. 1, the core network 1001 is connected to the Internet or the like and has a function of converting an input signal into a wireless protocol. The MeNB 1002 wirelessly transmits and receives a common channel to and from the mobile terminal 1006. In addition, the MeNB 1002 wirelessly transmits and receives user data to and from at least one or more SeNB mounted on the flying object 1005.

The flying object 1005 is a flying object equipped with a base station function, and specifically has a function corresponding to the SeNB in 3GPP. The SeNB in the flying object 1005 converts data transmitted from the core network 1001 into a wireless transmission format, and further transmits the data to the mobile terminal 1006.

In order to transmit and receive data transmitted from the core network 1001 to and from the artificial satellite 1004, the ground station 1003 performs format conversion and frequency conversion of the data. The artificial satellite 1004 transmits the data transmitted from the ground station 1003 to the flying object 1005 including the base station function.

In FIG. 2, the core network 1101 is installed in a communication operator's office or the like. The core network 1101 is connected to the Internet or the like, and has a function of terminating an input signal at a gateway and further converting the signal into a wireless protocol. The MeNB 1102 is installed on a building or the like in a user area. In addition, the MeNB 1102 wirelessly transmits and receives a common channel to and from the mobile terminal 1106. Further, the MeNB 1102 transmits and receives user data to and from at least one or more SeNB mounted on the flying object 1105.

The flying object 1105 is a flying object equipped with the base station function, and specifically has a function corresponding to the SeNB in 3GPP. The SeNB in the flying object 1105 converts the data transmitted from the core network 1101 into a wireless transmission format, and further transmits the data to the mobile terminal 1106.

FIG. 2 illustrates a case where the flying object 1105 has two types of antennas including one for connecting with the MeNB and one for communicating with mobile terminal; however, the flying object 1105 may perform communication using APAA or the like by changing the directivity of the transmission/reception beams with one antenna.

A base station, which is specifically an SeNB, is usually installed on a building, a telephone pole, or a communication tower dedicated to the base station. Therefore, in order for the mobile terminal 1106 to perform cell search efficiently, it is desirable that the directivity of the transmission/reception beam is set to an angle that is highly likely to detect the base station (SeNB). In FIG. 2, the directivity of the transmission/reception beam of the mobile terminal 1106 is indicated by the dotted lines. It is desirable to perform cell search with the direction of the transmission/reception beam set to such an angle to reduce the initial acquisition time and further improve the handover connection rate.

Figure 3:
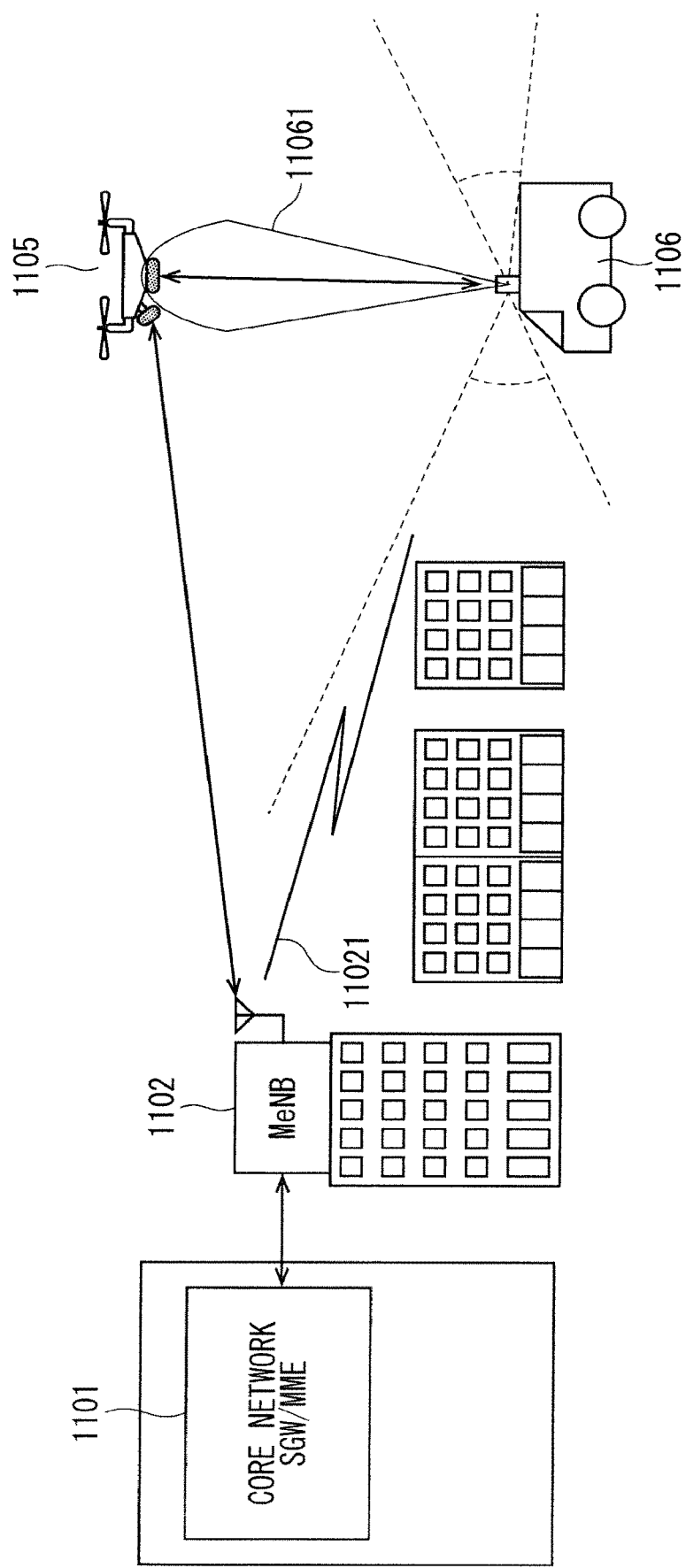
FIG. 3 is a diagram illustrating an operation for notifying broadcast information.

Therefore, according to the present embodiment, the MeNB 1102 detects completion of setting of the SeNB in the same cell and mounted on the flying object 1105, and then notifies the mobile terminal 1106, by including in broadcast information 11021, of information that specifies whether or not the SeNB is mounted to the flying object 1105, which is flying object specification information, together with SeNB cell ID or offset information of identification signal of the SeNB mounted in the flying object 1105 by using Neighbouring Cell List included in broadcast information to be transmitted to the mobile terminal 1106 in the area of MeNB 1102, or by using the Neighbouring Cell List after updating the Neighbouring Cell List with control information such as RRC connection reconfiguration. FIG. 3 is a diagram illustrating an operation of notifying the broadcast information 11021.

The mobile terminal 1106 that has received the flying object specification information included in the broadcast information 11021 detects the flying object 1105 including the direction with a large elevation angle to search for the cell ID corresponding to the flying object 1105 and associated identification signal. FIG. 3 illustrates an SeNB detection beam directivity 11061 in a case where the mobile terminal 1106 searches for a base station corresponding to the flying object 1105. As illustrated in FIG. 3, the direction of the transmission/reception beam (an SeNB detection beam directivity 11061) in a case where the notification of the flying object specification information is received is in a vertically upward direction compared to the direction of the transmission/reception beam (dotted line) in a case where the notification of the flying object specification information is not received. If necessary for the cell search, the directivity of the transmission/reception beam is changed variously by changing the direction of the antenna of the mobile terminal 1106 to detect the flying object 1105 located in the direction with a large elevation angle.

With the above configuration, since the directivity of the transmission/reception beam can be changed based on the broadcast information 11021 even in the case where the SeNB is provided in the flying object 1105 located in a direction with a large elevation angle, more specifically, in the sky or the like, the SeNB provided in the flying object 1105 can be detected, for example.

Also, in the case where search efficiency is increased by reducing the proportion of time to search the direction with a large elevation angle and the received broadcast information 11021 indicates that the flying object 1105 is equipped with the SeNB, the flying object 1105 can be efficiently detected by increasing the proportion of time to search the direction with a large elevation angle.

Figure 4:
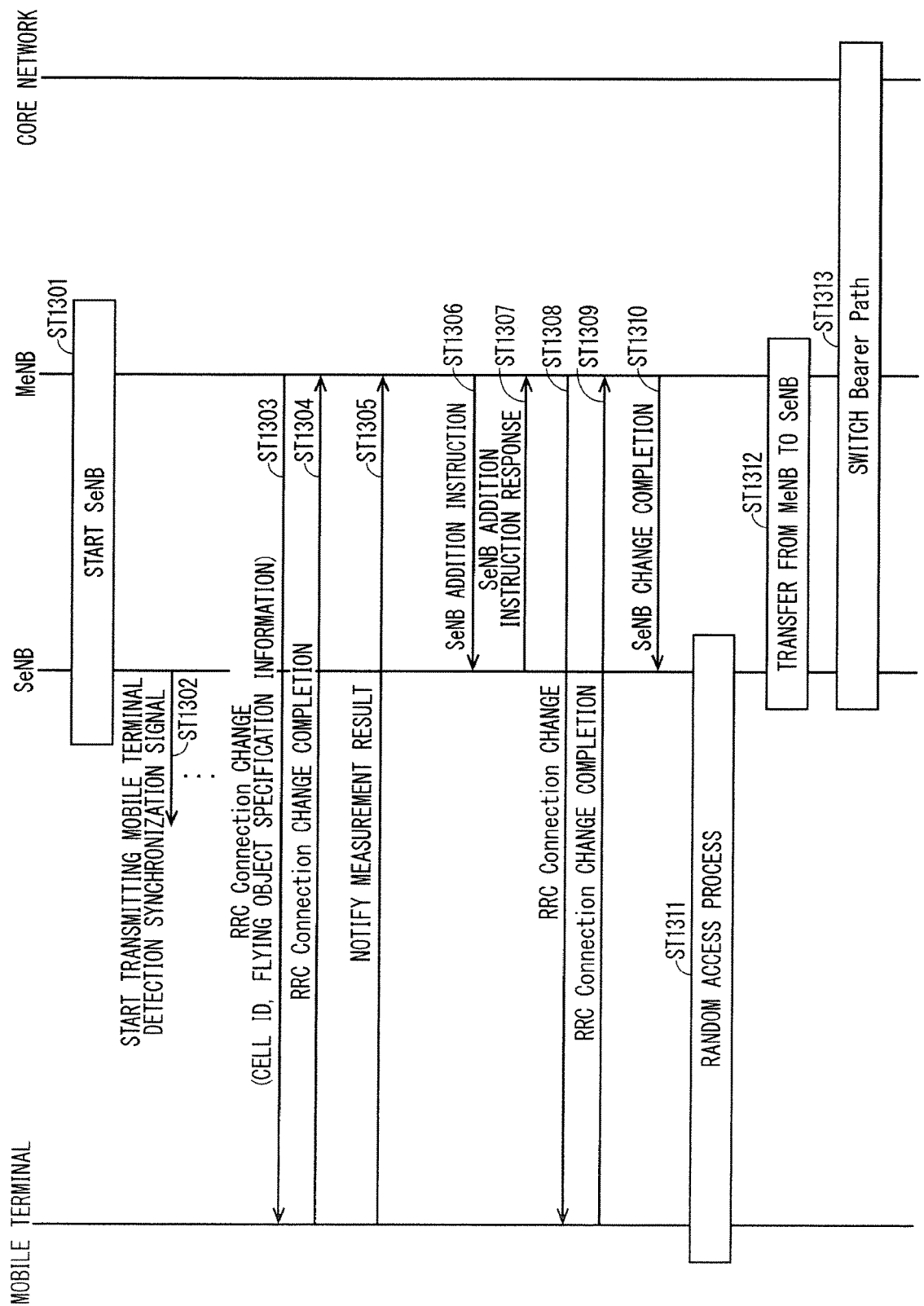
FIG. 4 is a sequence diagram illustrating an operation of the communication apparatus including notification of broadcast information and cell search.

Notifying the broadcast information and cell searching will be described with reference to FIGS. 2, 3, and 4. Here, FIG. 4 is a sequence diagram illustrating operation by the communication apparatus including notifying the broadcast information and cell searching.

First, in step ST1301, the SeNB provided in the flying object 1105 is started. Then, in a case where the SeNB is provided in a flying object, such as a drone or the like, communication between the SeNB and the MeNB 1102 is established after the drone or the like is moved to a predetermined position.

Therefore, the SeNB is equipped with a subscriber identity module (SIM) as in the mobile terminal 1106 and establishes initial acquisition, location registration, and RRC connection as a mobile terminal. With this configuration, the configuration information of the SeNB provided in the flying object 1105 can be transmitted from the MeNB 1102 to the SeNB.

At this time, when maintaining the SeNB, for example, by setting an operations, administration and maintenance (OAM) function unit for downloading startup software or monitoring a state of a device such as ALM/ACT and the like, an SeNB-MeNB communication function unit, and a function unit that conducts data transfer between the core network and mobile terminal respectively to different lines, the same processing can be performed and stable operation can be performed even in a case of wired connection. Alternatively, in a case where these functional units are set to a same line and signals are multiplexed or separated within the line, a termination function is added to both of the SeNB and MeNB 1102. The configuration can be formed in a single line in this manner. In general, the cost can be reduced when the number of lines is reduced.

In the above configuration, since the MeNB 1102 has a wireless transmission function, the SeNB in flying object 1105 is installed with the SIM and the MeNB and SeNB are connected using the SeNB as a mobile terminal; however, tunneling of the above wireless protocol can be performed by using another wireless system such as a wireless LAN.

Moreover, when a satellite line is used as illustrated in FIG. 1, a response between the SeNB and MeNB is much slower than usual. Therefore, in Step ST1308, the MeNB 1102 issues an instruction to change various timer values corresponding to allowable connection time using the RRC setting change to the mobile terminal 1106.

Next, in Step ST1302, the SeNB in the flying object 1105 transmits a signal equivalent to a primary synchronization signal (PSS) and a secondary synchronization signal (SSS) for the mobile terminal 1106 to synchronize.

Next, in Step ST1303, the MeNB 1102 notifies the mobile terminal 1106 of the Neighbouring Cell List using broadcast information 11021 or dedicated control channel (DCCH). By notifying the Neighbouring Cell List, for example, the cell ID, the flying object specification information, and the like are notified, and the setting is changed according to need.

The Neighbouring Cell List is a list of neighbor cell candidates to be searched, which notifies a set of the cell ID, rough timing offset information for each ID corresponding to facilitate detection of the cell ID, frequency offset information, and offset information of the seed of a random code such as a Gold code. According to the present embodiment, in addition to the cell ID and various pieces of offset information, a bit for specifying whether or not the SeNB is provided in the flying object is added.

Further, in the Neighbouring Cell List, the Neighbouring Cell List for cells of the flying object 1105 and the Neighbouring Cell List for cells other than the flying object 1105 are notified as separate list information, to make clear that which cell ID corresponds to the flying object 1105.

Further, there may be a case where the flying object 1105 is not stationary at a certain position. For example, by moving in a circle, an area being always under a shadow of a building can be reduced. In such a case, it is also effective to add a moving speed of the flying object 1105 in the Neighbouring Cell List. With this configuration, the detection process can be performed in consideration of the possibility of Doppler shift even when the mobile terminal 1106 is stationary.

It is also effective to add information specifying a moving path of the flying object 1105 even when the moving path of the flying object 1105 is not a moving path that draws a circle. In particular, when APAA is used and the direction of the transmission/reception beam and the altitude of the flying object 1105 change periodically, it is also effective to add information on the moving path of the flying object 1105 including a cycle of the change. With this configuration, searching can be performed corresponding to timing at which the transmission/reception beam of the mobile terminal 1106 is directed toward the flying object 1105.

It is also effective to add altitude information of the flying object 1105 having the SeNB in the Neighbouring Cell List. In particular, when information on various geodetic systems such as WGS84 obtained from GPS is added to the Neighbouring Cell List, the cell search can be performed in a short time. At the same time, when APAA is used in the mobile terminal 1106, a half-value beam width or transmission power can be adjusted based on the altitude information of the flying object 1105 including the SeNB. Therefore, interference caused by transmission/reception beams to other cells can be reduced. The present embodiment is also effective in a case of an SeNB located at a position so as to emit transmission/reception beam downward (toward the ground) from a top of a certain building in an area of buildings such as skyscrapers, for example.

Next, in step ST1304, the mobile terminal 1106 notifies the MeNB 1102 that the change is completed. Next, in step ST1305, the mobile terminal 1106 notifies the MeNB 1102 of a measurement result such as communication quality.

Next, in step ST1306, the MeNB 1102 gives an additional instruction to the SeNB in the flying object 1105. Then, in step ST1307, the SeNB in the flying object 1105 makes a response, to the MeNB 1102, corresponding to the additional instruction.

Next, in step ST1308, the MeNB 1102 issues a connection destination change instruction to the mobile terminal 1106 by changing the RRC connection setting. Next, in step ST1309, the mobile terminal 1106 notifies the MeNB 1102 of the change completion. Next, in step ST1310, the MeNB 1102 notifies the SeNB in the flying object 1105 of that the change is completed.

Next, in step ST1311, the mobile terminal 1106 and the SeNB in the flying object 1105 perform random access processing.

Next, in step ST1312, data is transferred from the MeNB 1102 to the SeNB in flying object 1105 (SN, Data-forwarding).

Next, in step ST1313, the MeNB 1102, the core network 1101, and the SeNB in the flying object 1105 perform bearer path switching.

Modification of First Embodiment

In the following, a case where the MeNB and SeNB are provided in the flying object is described.

Figure 5:
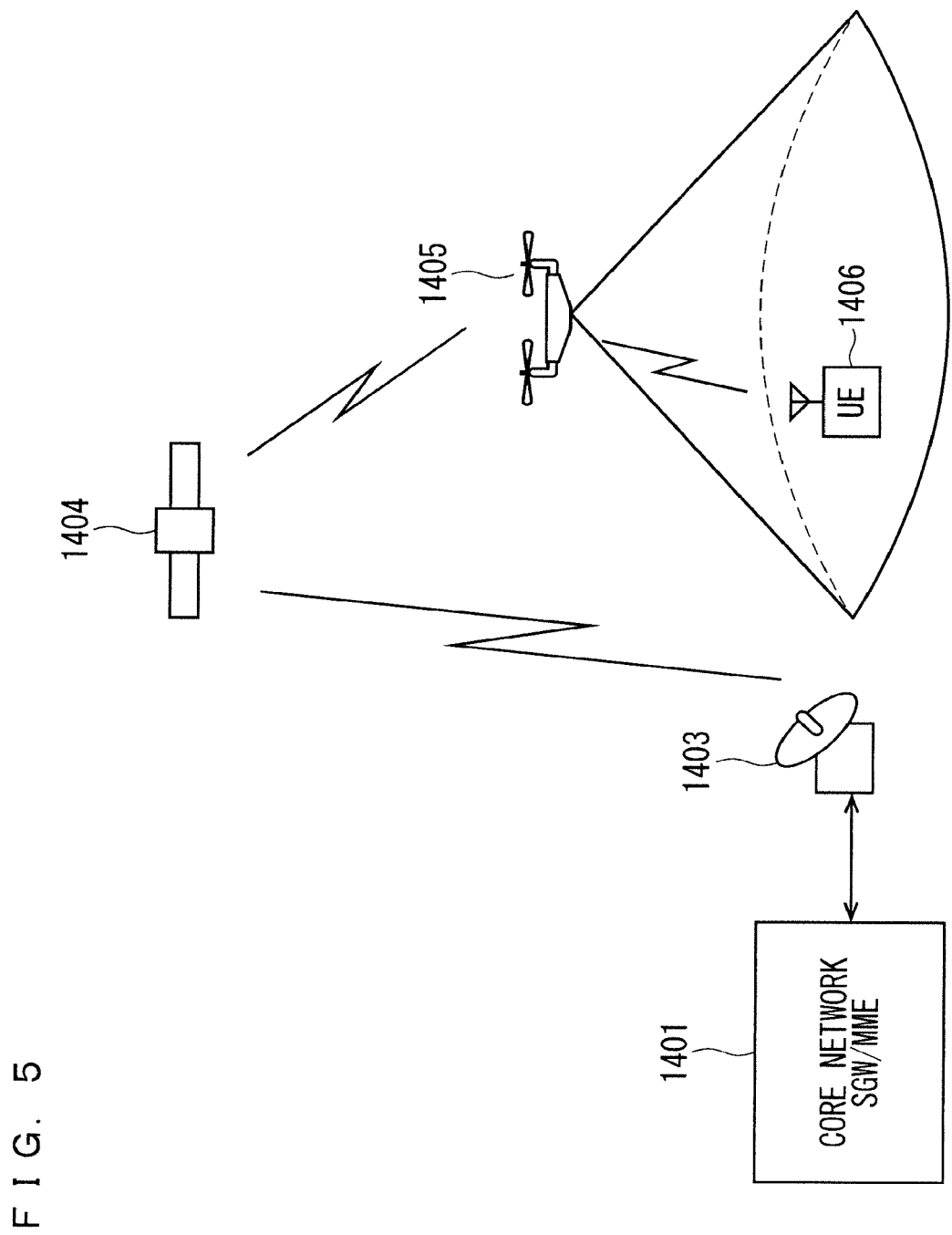
FIG. 5 is a diagram schematically illustrating a modified example of the configuration of the communication apparatus according to the embodiment.

In a case where a temporary increase of radio traffic or the like is predicted, it is also effective to provide an MeNB and an SeNB in the flying object. At this time, as illustrated in FIG. 5, a connection between the core network and the base station (MeNB+SeNB) is established through a line such as a satellite line, and communication between the flying object including the MeNB and the SeNB and the core network is established. Or, as illustrated in FIG. 6, the connection between the core network and the base station (MeNB+SeNB) is performed using time, frequency, code or space, which is not used in communication with the mobile terminal, and communication between the flying object and the core network is established.

Here, FIG. 5 is a diagram schematically illustrating a modified example of the configuration of the communication apparatus according to the present embodiment. As illustrated in FIG. 5, the communication apparatus includes a core network 1401, a ground station 1403, an artificial satellite 1404, a flying object 1405, and a mobile terminal 1406.

Figure 6:
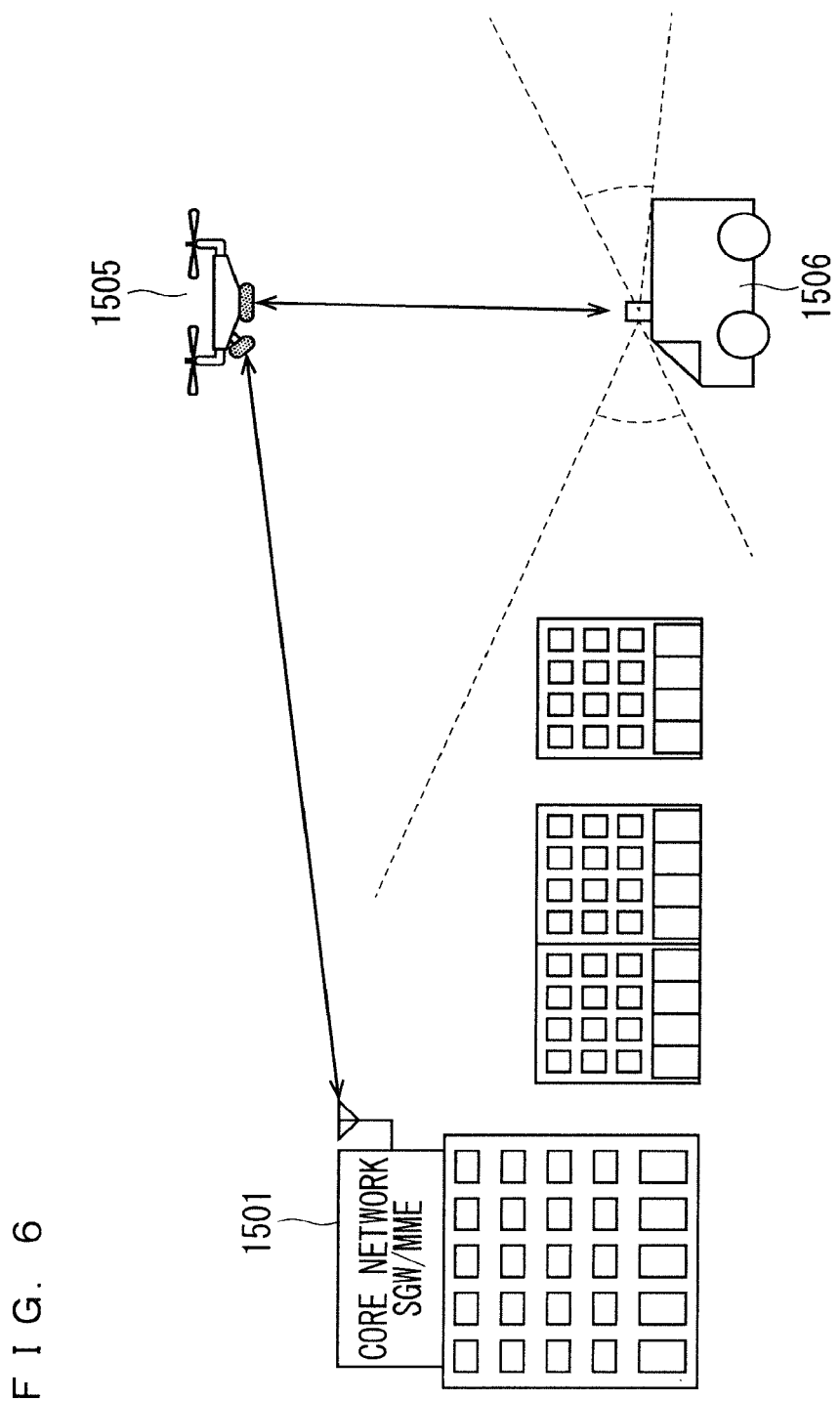
FIG. 6 is a diagram schematically illustrating a modified example of the configuration of the communication apparatus according to the embodiment.

Further, FIG. 6 is a diagram schematically illustrating a modified example of the configuration of the communication apparatus according to the present embodiment. As illustrated in FIG. 6, the communication apparatus includes a core network 1501, a flying object 1505, and a mobile terminal 1506 such as a vehicle.

In FIG. 5, the core network 1401 is connected to the Internet or the like and has a function of converting an input signal into a wireless protocol. The core network 1401 performs radio transmission/reception with at least one base station, that is, the flying object 1405 including the MeNB and the SeNB.

The flying object 1405 is a flying object including a base station function (MeNB+SeNB). The flying object 1405 serves as the MeNB and SeNB and converts data transmitted from the core network 1401 into a wireless transmission format, and transmits the data to the mobile terminal 1406.

To transmit and receive data transmitted from the core network 1401 to and from the artificial satellite 1404, the ground station 1403 for satellite communication performs format conversion and frequency conversion of the data. The artificial satellite 1404 transmits the data transmitted from the ground station 1403 to the flying object 1405 including the base station function.

In FIG. 6, the core network 1501 is installed in a communication operator's office or the like. The core network 1501 is connected to the Internet or the like and has a function of converting an input signal into a wireless protocol.

The flying object 1505 is a flying object equipped with a base station function (MeNB+SeNB). The flying object 1505 serves as the MeNB and SeNB, converts data transmitted from the core network 1501 into a wireless transmission format, and further transmits the data to the mobile terminal 1506.

The flying object 1505 in FIG. 6 has two types of antennas for core network connection and for mobile terminal communication; however, the flying object 1505 may communicate using APAA or the like by changing the directivity of transmission/reception beams with one antenna.

A base station (MeNB+SeNB) is usually installed on a building, a telephone pole, or a communication tower dedicated to the base station. Therefore, in order for the mobile terminal 1506 to perform cell search efficiently, it is desirable that the directivity of the transmission/reception beam is set to an angle that is highly likely to detect the base station (MeNB+SeNB). In FIG. 6, the directivity of the transmission/reception beam of the mobile terminal 1506 is indicated by the dotted lines. It is desirable to perform cell search with the transmission/reception beam set to such an angle to reduce the initial acquisition time and further improve the handover connection rate.

Figure 7:
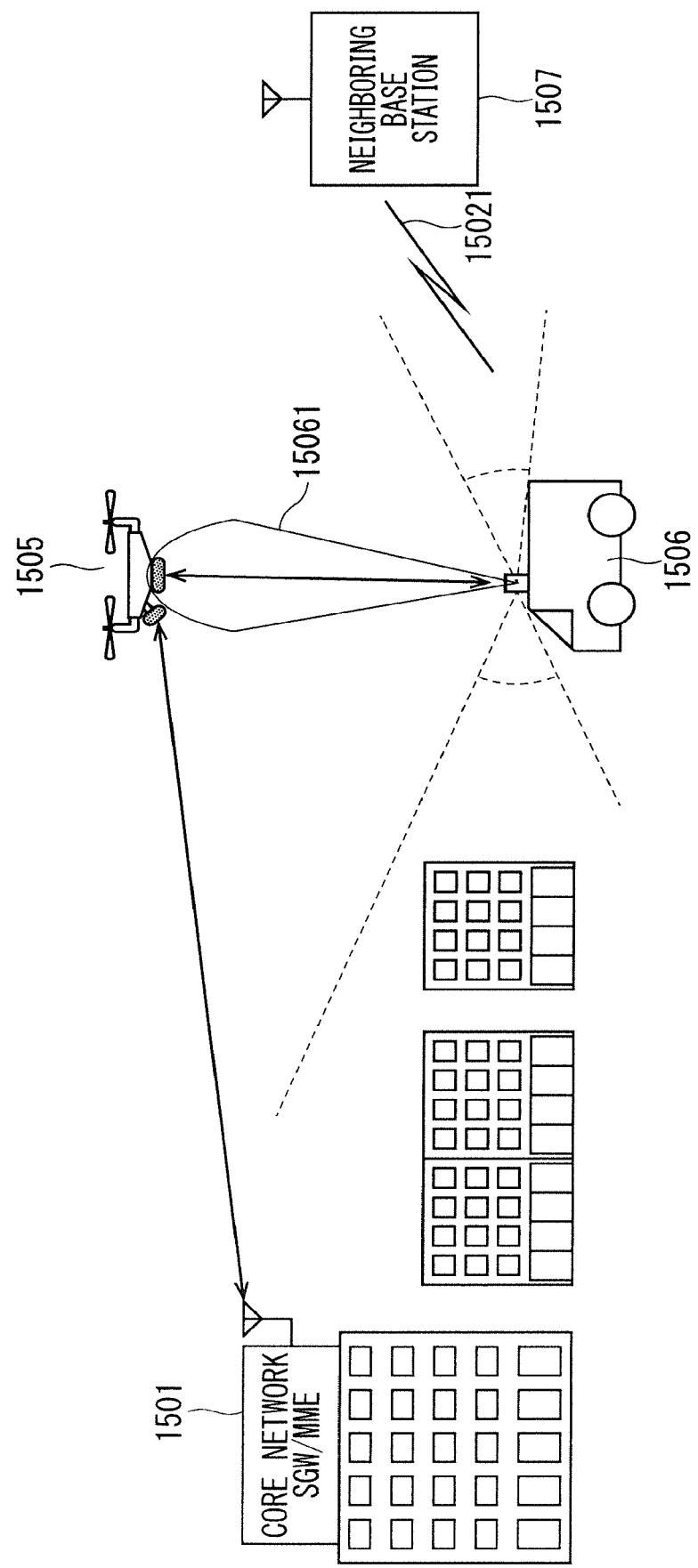
FIG. 7 is a diagram illustrating an example of an operation for notifying broadcast information.

Therefore, according to the present embodiment, a neighboring base station 1507 located near the mobile terminal 1506 adds flying object specification information that specifies whether or not the MeNB and SeNB is provided in the flying object 1505 to the broadcast information 15021 together with a cell ID of the base station (MeNB+SeNB) included in the flying object 1505 or offset information of identification signal of the base station (MeNB+SeNB) and notifies the mobile terminal 1506 of the broadcast information 15021, by using the Neighbouring Cell List included in the broadcast information transmitted from the neighboring base station 1507 to the mobile terminal 1506 or the Neighbouring Cell List updated with control information such as RRC Connection Reconfiguration. FIG. 7 is a diagram illustrating operation of notifying the broadcast information 15021. Here, the neighboring base station 1507 belongs to a cell different from the cell to which the base station (MeNB+SeNB) included in the flying object 1505 belongs.

The mobile terminal 1506 that has received the broadcast information 15021 detects the flying object 1505 at an angle including a direction with a large elevation angle in order to search for the cell ID and the identification signal associated with the cell ID corresponding to the flying object 1505. FIG. 7 illustrates a base station detection beam directivity 15061 when the mobile terminal 1506 performs the above cell search. If necessary for the cell search, the directivity of the transmission/reception beam is variously changed by changing the direction of the antenna in the mobile terminal 1506 to detect the flying object 1505.

With the above configuration, the directivity of the transmission/reception beam can be changed based on the broadcast information 15021 even when the flying object 1505 located at a position where the elevation angle is large, specifically in the sky or the like is provided with MeNB and SeNB, and the MeNB and SeNB provided in the flying object 1505 can be detected, for example.

Figure 8:
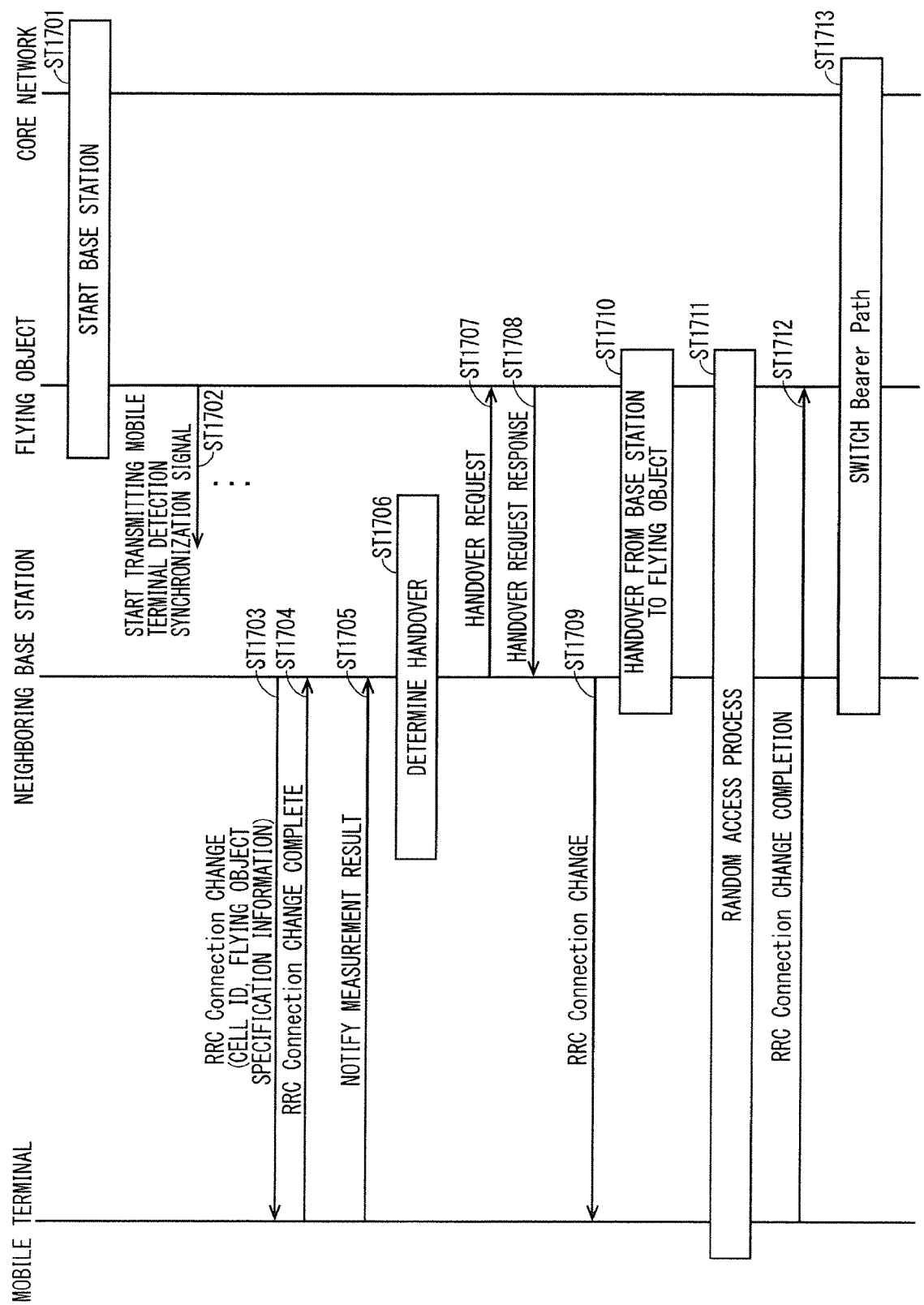
FIG. 8 is a sequence diagram illustrating an operation of the communication apparatus including notification of broadcast information and cell search.

Notifying the broadcast information and cell searching will be described with reference to FIGS. 6, 7, and 8. Here, FIG. 8 is a sequence diagram illustrating the operation of the communication apparatus including notifying broadcast information and cell searching.

First, in step ST1701, the MeNB and SeNB provided in the flying object 1505 are started, that is, the base station is started. Here, in a case where the flying object 1505 such as a drone is provided with the MeNB and SeNB, communication between the MeNB and SeNB and the core network 1501 is established after the drone is moved to a predetermined position.

Therefore, the flying object 1505 including the MeNB and SeNB is equipped with a SIM as in the mobile terminal 1506, and performs initial acquisition, location registration, and RRC connection establishment as a mobile terminal. With this configuration, the configuration information of the MeNB and SeNB included in the flying object 1505 can be transmitted from the core network 1501 to the MeNB and SeNB included in the flying object 1505.

In this case, when maintaining the MeNB and SeNB provided in flying object 1505, for example, setting the OAM function unit for downloading start-up software or monitoring a status of a device such as ALM/ACT and the like, a core network-flying object communication function unit, and the functional units that conduct data transfer between the core network and the mobile terminal to different lines, the same processing can be performed in a wired connection and stable operation can be performed. Alternatively, in a case where these functional units are set to the same line and signals are multiplexed or separated within the line, termination functions are added to both the flying object 1505 and the core network 1501. The configuration can be formed in a single line in this manner. In general, the cost can be reduced when the number of lines is reduced.

In the above description, the SIM is mounted on the flying object 1505 and the wireless line is connected to the flying object 1505 as a mobile terminal; however, the wireless protocol may be tunneled using another wireless system such as a wireless LAN.

Further, in a case where a satellite line is used as illustrated in FIG. 5, the response between the flying object (MeNB+SeNB) and the core network is much slower than usual. Therefore, in step ST1709, an instruction to change various timer values corresponding to the allowable connection time is issued from the flying object 1505 to the mobile terminal 1506 by changing the RRC connection setting.

Next, in step ST1702, the flying object 1505 transmits a PSS for the mobile terminal 1506 to synchronize and a signal corresponding to an SSS.

Next, in Step ST1703, the neighboring base station 1507 notifies the Neighbouring Cell List to the mobile terminal 1506 using the broadcast information 15021 or DCCH.

The Neighbouring Cell List is a list of neighbor cell candidates to be searched, which notifies a set of the cell ID, rough timing offset information for each ID corresponding to facilitate detection of the cell ID, frequency offset information, and offset information of the seed of a random code such as a Gold code. According to the present embodiment, in addition to the cell ID and various offset information, a bit for specifying whether or not the MeNB and SeNB are provided in the flying object is added.

Or, in the Neighbouring Cell List, the Neighbouring Cell List for cells of the flying object 1505 and the Neighbouring Cell List for cells of devices other than the flying object 1505 are notified as separate list information, so that it can be recognized which cell ID corresponds to the flying object.

Further, there may be a case where the flying object 1505 is not stationary at a certain position. For example, by moving in a circle, an area being always under a shadow of a building can be reduced. In such a case, it is also effective to add information on the moving speed of the flying object 1505 to the Neighbouring Cell List. With this configuration, the detection process can be performed in consideration of the possibility of the Doppler shift even when the mobile terminal 1506 is stationary.

It is also effective to add information specifying a moving path of the flying object 1505 even when the moving path of the flying object 1505 is not a moving path that draws a circle. In particular, when APAA is used and the direction of the beam and the height of the flying object 1505 change periodically, it is also effective to add information on the moving path of the flying object 1505 including a cycle of the change. With this configuration, searching can be performed corresponding to timing at which the transmission/reception beam is directed toward the flying object 1505.

It is also effective to add altitude information of the flying object 1505 having the MeNB and SeNB in the Neighbouring Cell List. In particular, when information on various geodetic systems such as WGS84 obtained from GPS is added to the Neighbouring Cell List, the cell search can be performed in a short time. At the same time, when APAA is used in the mobile terminal 1506, a half-value beam width or transmission power can be adjusted based on the altitude information of the flying object 1505 provided with the MeNB and SeNB. Therefore, interference caused by transmission/reception beams to other cells can be reduced. The present embodiment is also effective in a case of a base station (MeNB+SeNB) located at a position so as to emit beam downward from a top of a certain building in an area of buildings such as skyscrapers, for example.

Next, in step ST1704, the mobile terminal 1506 notifies the change completion to the neighboring base station 1507. Next, in step ST1705, the mobile terminal 1506 notifies the neighboring base station 1507 of a measurement result such as communication quality.

Next, in step ST1706, the neighboring base station 1507 determines a handover while referring to the result notification from the mobile terminal 1506.

Next, in step ST1707, the neighboring base station 1507 makes a handover request to the flying object 1505. Next, in step ST1708, the flying object 1505 sends, to the neighboring base station 1507, a response corresponding to the handover request.

Next, in step ST1709, the neighboring base station 1507 issues an instruction to change the connection destination of the RRC connection to the mobile terminal 1506.

Next, in step ST1710, data is transferred from the neighboring base station 1507 to the flying object 1505 (SN, Data-forwarding).

Next, in step ST1711, the mobile terminal 1506, the neighboring base station 1507, and the flying object 1505 perform random access processing.

Next, in step ST1712, the mobile terminal 1506 notifies to the base station of the flying object 1505 that the change has been completed.

Next, in step ST1713, the neighboring base station 1507, the core network 1501, and the base station in the flying object 1505 perform bearer path switching.

Second Embodiment

A communication apparatus according to the present embodiment will be described. In the following description, the same components as those described in the above described embodiment are denoted by the same reference numerals, and detailed description thereof will be omitted as appropriate.

Hereinafter, a case where a mobile terminal is provided in a flying object, or a case where the flying object itself is the mobile terminal will be described.

Figure 9:
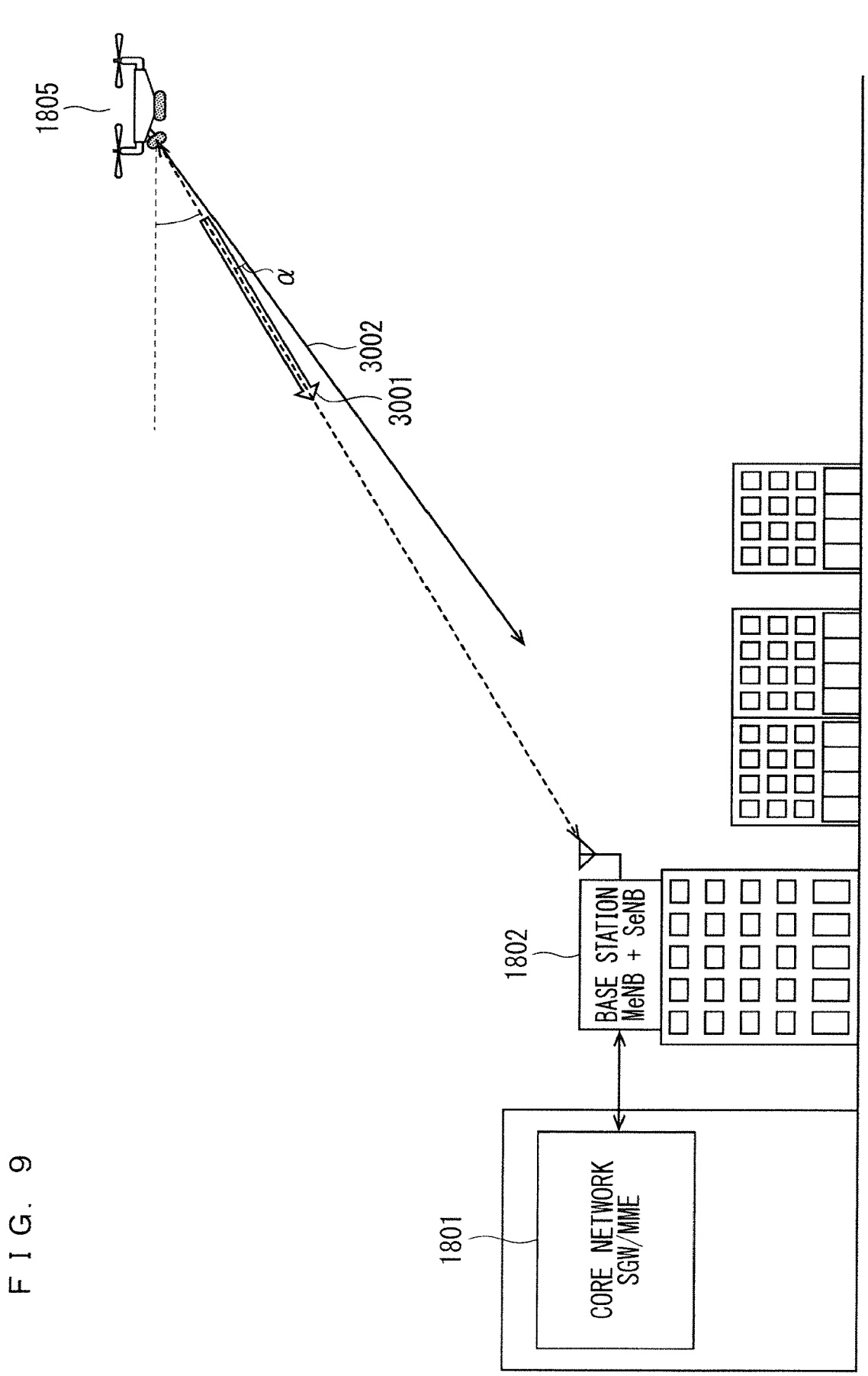
FIG. 9 is a diagram schematically illustrating a configuration of a communication apparatus according to an embodiment.

Such an aspect is effective for transportation of goods by a drone. In such a case, as illustrated in FIG. 9, communication is performed between a flying object 1805 including a mobile terminal or as a mobile terminal itself and a base station 1802 (MeNB+SeNB). Here, FIG. 9 is a diagram schematically illustrating a configuration of the communication apparatus according to the present embodiment. The communication apparatus illustrated in FIG. 9 includes a core network 1801, the base station 1802 (MeNB+SeNB), and the flying object 1805 that includes a mobile terminal or is a mobile terminal itself.

When establishing this communication, the flying object 1805 is likely to be visible to the base station 1802. When the flying object 1805 is visible, a propagation loss equivalent to free space is assumed. In other words, the propagation loss is proportional to the square of the propagation distance. In general, the propagation loss in a city or the like is proportional to the 3.5th power of the propagation distance, so that the propagation loss is reduced and the signal is propagated farther. For this reason, it is conceivable that the influence of interference extends to a neighboring cell or a next neighboring cell depending on the situation.

For example, in a case of allowing 3 to the power of 3.5 for a propagation loss when a signal propagates for 3 km in a normal cell design, the propagation distance in free space is expressed by the following Equation (1).

[Equation 1]

$$(3^{3.5})^{1/2} = 6.8 \text{ [km]} \tag{1}$$

According to the present embodiment, in a case where the mobile terminal is provided in the flying object 1805, or a case where the flying object 1805 itself is a mobile terminal, and provided with APAA or provided with a configuration in which the antenna orientation can be mechanically changed, the directivity of the transmission/reception beam is controlled as follows.

First of all, in a first method, when the flying object 1805 (the mobile terminal) receives a transmission signal of the base station 1802, a tilt angle α is set, in a direction 3002 where the antenna is facing, with respect to the direction 3001 in which the antenna can receive the signal with a maximum power. Thereby, since the propagation distance of the signal is shortened, the transmission power from the flying object 1805 is prevented from being transmitted outside the cell area. Note that, in FIG. 9, the tilt angle α is exemplified as an angle inclined vertically downward from the direction 3001 in which the signal can be received with the maximum power; however, the tilt angle α may be changed depending on the position of the base station or the like where signal interference is to be avoided.

For example, the tilt angle α may be an angle that tilts vertically upward when a base station or the like that signal interference needs to be avoided is located directly below the flying object 1805.

The magnitude of the tilt angle α may be fixedly given, for example, 2° or 3°. In this manner, signal interference to other cells can be reduced with simple control.

The magnitude of the tilt angle α may be determined according to what level of degrees the direction 3001 in which the signal can be received with the maximum power is with respect to the horizontal direction when the flying object 1805 (mobile terminal) receives the transmission signal of the base station 1802. For example, based on the direction 3001 in which the signal can be received with the maximum power when the flying object 1805 (mobile terminal) receives the transmission signal of the base station 1802, the tilt angle α may be set to 0° in a case where the direction 3001 has an angle equal to or larger than 30° with respect to the horizontal direction, the tilt angle α may be set to 1° in a case where the direction 3001 has an angle equal to or larger than 20° and smaller than 30° with respect to the horizontal direction, the tilt angle α may be set to 2° in a case where the direction 3001 has an angle equal to or larger than 10° and smaller than 20° with respect to the horizontal direction, and the tilt angle α may be set to 3 in a case where the direction 3001 has an angle equal to or larger than 0° and smaller than 10° with respect to the horizontal direction. In addition, in a case where the direction 3001 is close to the horizontal direction, since there is an increased possibility of signal interference with other cells, it is effective to set the tilt angle α larger accordingly.

For example, the tilt angle α may be automatically determined according to what level of degrees the direction 3001 in which the transmission signal of the base station 1802 can be received at maximum power is with respect to the horizontal direction. For example, the following Equation (2) may be used.

[Equation 2]

$$\text{Tilt angle} = \text{Reference tilt angle} \times \frac{\text{Reference value of angle between direction in which signal is received at maximum power and horizontal direction}}{\text{Angle between direction in which reception is performed at maximum power and horizontal direction}} \quad (2)$$

In Equation (2), it is preferable that the reference tilt angle is set to 2° and the reference value of the angle between the horizontal direction and the direction 3001 that can be received with the maximum power is set to 15°.

The magnitude of the tilt angle α may be determined according to the half-value beam width of the transmission/reception beam. For example, when the half-value beam width is 30° and the tilt angle α is 4°, an unnecessary beam is unlikely to be sent far when the beam width is 15°. Therefore, it is effective to set a smaller tilt angle α, for example, a tilt angle α of 3.

For example, the tilt angle α may be automatically determined according to the half-value beam width by defining with an arithmetic expression. For example, the following Equation (3) may be used.

[Equation 3]

$$\text{Tilt angle} = \text{Transmitting half-value beam width} \times \frac{\text{Reference tilt angle}}{\text{Reference half-value beam width}} \quad (3)$$

In Equation (3), the reference tilt angle is preferably 4°, and the reference half-value beam width is 30°.

In addition, although the above Equation (3) is defined by the half-value beam width, it may be an EIRP in consideration of the beam transmission power.

The magnitude of the tilt angle α may be determined according to the altitude of the flying object 1805. For example, when the flying object 1805 has altitude of 80 m and the tilt angle α is 4°, if the flying object 1805 has altitude of 40 m, it is difficult for unnecessary beams to be sent far away. Therefore, it is effective to set a smaller tilt angle α, for example, a tilt angle α of 3°.

Further, in the above description, the parameters for individually determining the magnitude of the tilt angle α have been described: however, the parameters may be determined in combination. Therefore, instead of using "what level of degrees the direction in which the reception can be performed with the maximum power is relative to the horizontal direction" and "altitude of the flying object," using "altitude of the flying object" and "distance to base station" is also equivalent.

When each parameter is a linear function, the following Equation (4) can be derived.

[Equation 4]

$$\text{Tilt angle} \propto \alpha \times D \times B \times H \quad (4)$$

where,
α: Constant
D: Distance to base station
B: Half-value beam width
H: Altitude of flying object The above first method has been described as a method autonomously performed by the flying object 1805 (mobile terminal). According to the first method, simple control can be performed for each mobile terminal.

However, in order to reduce the interference of the entire communication apparatus, it is effective that the base station 1802 determines the tilt angle α of the antenna of the flying object 1805 and the determined tilt angle α is informed from the base station 1802 to the flying object 1805 (mobile terminal).

Considering the distance to the flying object 1805 (mobile terminal), the altitude of the flying object 1805, the half-value beam width of the flying object 1805 (mobile terminal), and the like, which are measured by the base station 1802, the base station 1802 notifies the flying object 1805 (mobile terminal) of the tilt angle α of the transmission/reception beam by RRC connection reconfiguration at the time of position registration, establishment of an individual channel by random access, or establishment of an individual channel after a handover.

Considering the distance to the flying object 1805 (mobile terminal), the altitude of the flying object 1805, the half-value beam width of the flying object 1805 (mobile terminal), and the like, which are measured by the base station 1802, it is also effective that the base station 1802 notifies the flying object 1805 (mobile terminal) of a minimum tilt angle α of the transmission/reception beam by RRC connection reconfiguration and the mobile terminal determines an actual tilt angle α at the time of position registration, establishment of an individual channel by random access, or establishment of an individual channel after a handover.

In this case, the minimum tilt angle α is instructed by the base station 1802 to prevent interference with other cells from being caused, and the optimal tilt angle α that changes momentarily according to the movement of the flying object 1805 is controlled in the mobile terminal side. With this configuration, the control load in the base station 1802 can be reduced.

Figure 10:
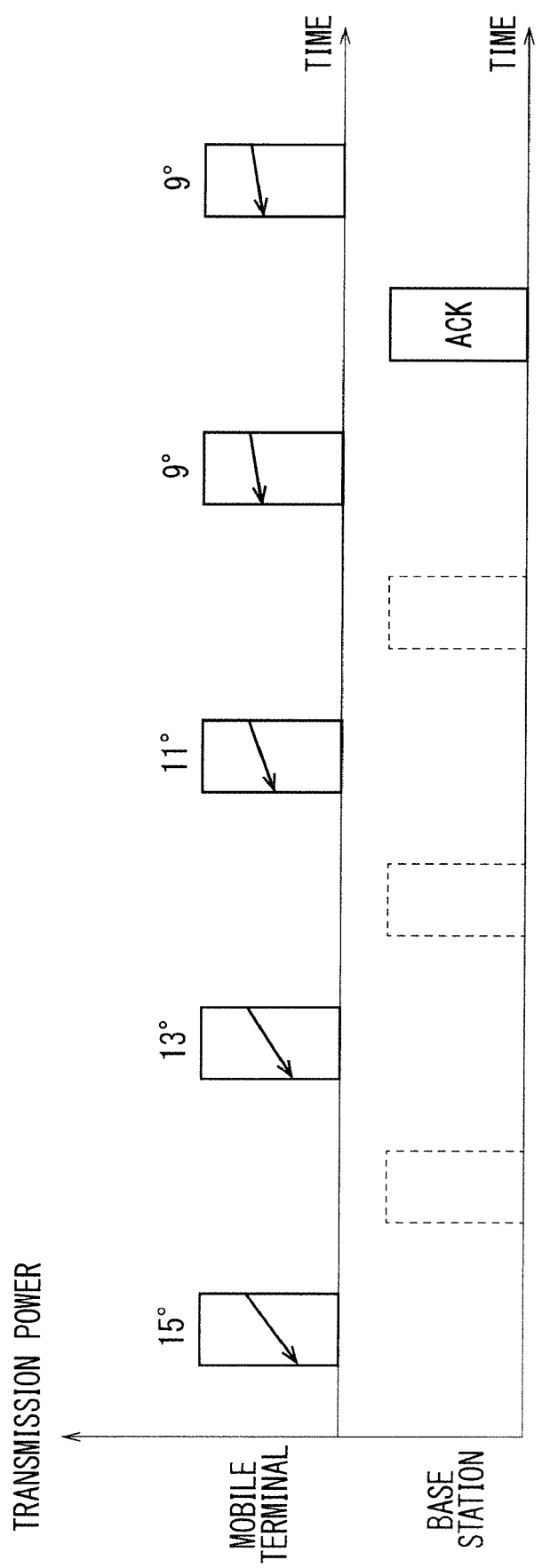
FIG. 10 is a diagram illustrating time transition of tilt angle control.
Figures 11, 12:
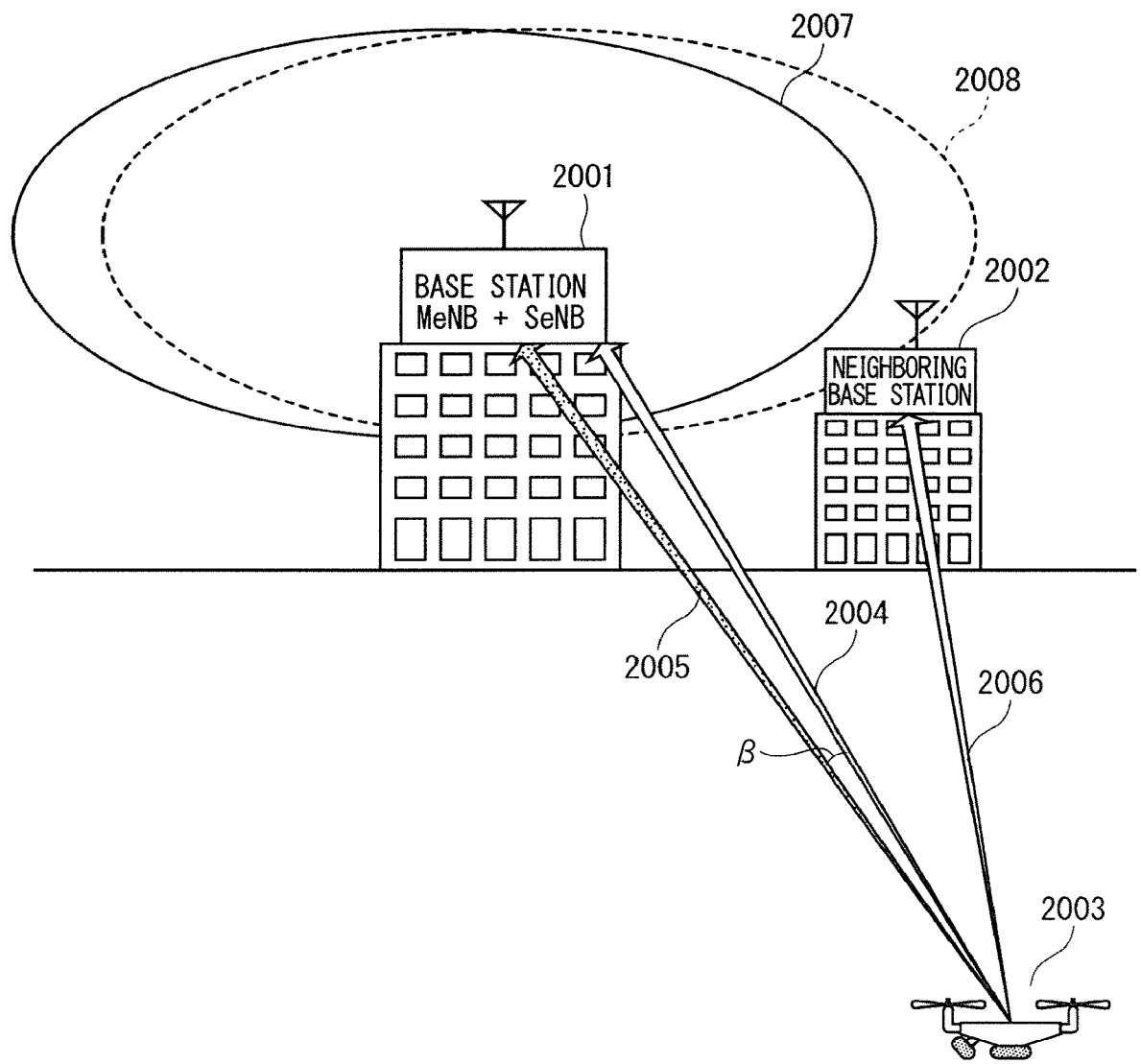
FIG. 11 is a diagram illustrating a transition of the tilt angle control according to a response from a base station.
FIG. 12 is a diagram illustrating an arrangement of each component viewed from a flying object.

In addition, for the same reason, when performing a random access, initially establishing communication, or establishing communication with a different base station by handover, it is also effective that a synchronization known sequence is transmitted in the mobile terminal, and a larger tilt angle α is gradually changed to be a smaller tilt angle α. As illustrated in FIGS. 10 and 11, when the response (ACK) is returned from the base station 1802 which is an apparatus at the other end, the control for reducing the tilt angle α is stopped. More specifically, until the response (ACK) is returned from the base station 1802, the tilt angle α is reduced to 15°, 13°, 11°, and 9° in the mobile terminal, and then the tilt angle α is fixed when the response (ACK) is returned from the base station 1802. This configuration is effective to find a tilt angle α that can propagate a signal to the base station 1802 and suppress signal interference with other cells as much as possible. FIG. 10 is a diagram illustrating time transition of the tilt angle control, in which the vertical axis indicates transmission power and the horizontal axis indicates time. FIG. 11 is a diagram illustrating transition of the tilt angle control according to the response from the base station.

Note that, the above embodiment describes a case where the mobile terminal is provided in the flying object or a case where the flying body itself is the mobile terminal; however, a similar effect by the tilt angle control can be obtained when the mobile terminal is a terminal whose vertical direction is prescribed.

Here, the terminal whose vertical direction is prescribed corresponds to, for example, a vehicle, a vending machine, or a terminal on which an array antenna is mounted. Here, the array antenna is an antenna in which a plurality of beam output elements are arranged on its surface and forms a beam to be output in a specific direction.

Modification 1 of Second Embodiment

Hereinafter, beam directivity control in the horizontal direction will be described.

When there are a number of base stations in the communication apparatus, as illustrated in FIG. 12, it is effective to shift an emission direction of the transmission/reception beam away from the neighboring base stations in the horizontal direction as well as the tilt angle control in the height direction. FIG. 12 is a diagram schematically illustrating a modified example of the configuration of the communication apparatus according to the present embodiment. FIG. 12 is a diagram illustrating an arrangement of each component viewed from the flying object This is particularly effective when another base station, that is, a neighboring base station 2002 exists at a position close to the base station with which communication is being performed.

Hereinafter, a description will be given with reference to FIG. 12.

A base station 2001 (MeNB+SeNB) communicates with a flying object 2003 (mobile terminal). When the flying object 2003 (mobile terminal) has a configuration capable of performing directivity control such as APAA, regarding the signal transmitted from the mobile terminal, in general, the directivity of the transmission/reception beam is controlled to be a direction 2004 that the signal from the base station 2001 can be received with a maximum power.

In FIG. 12, the half-value beam range 2008 of −3 dB in the above case is indicated by the dotted line. However, according to FIG. 12, when the angle between the direction 2006 in which the signal from the neighboring base station 2002 can be received with the maximum power and the direction 2004 is small as viewing from the mobile terminal, signal interference may occur.

Therefore, when the direction of the beam radiated from the flying object 2003 is shifted by a tilt angle β in the horizontal direction as in the direction 2005, the half-value beam width of −3 dB will be in the beam range 2007, and possible signal interference is reduced.

Here, in FIG. 12, the tilt angle β is exemplified as an angle inclined to the left side of the page from the direction 2004 in which the signal from the base station 2001 can be received with the maximum power; however, the direction in which the tilt angle β is tilted may be different depending on a position of a base station that signal interference needs to be avoided.

For example, when a base station that signal interference needs to be avoided is located on the left side on the page of the flying object 2003, the tilt angle β may be an angle that tilts to the right side of the page.

Figure 13:
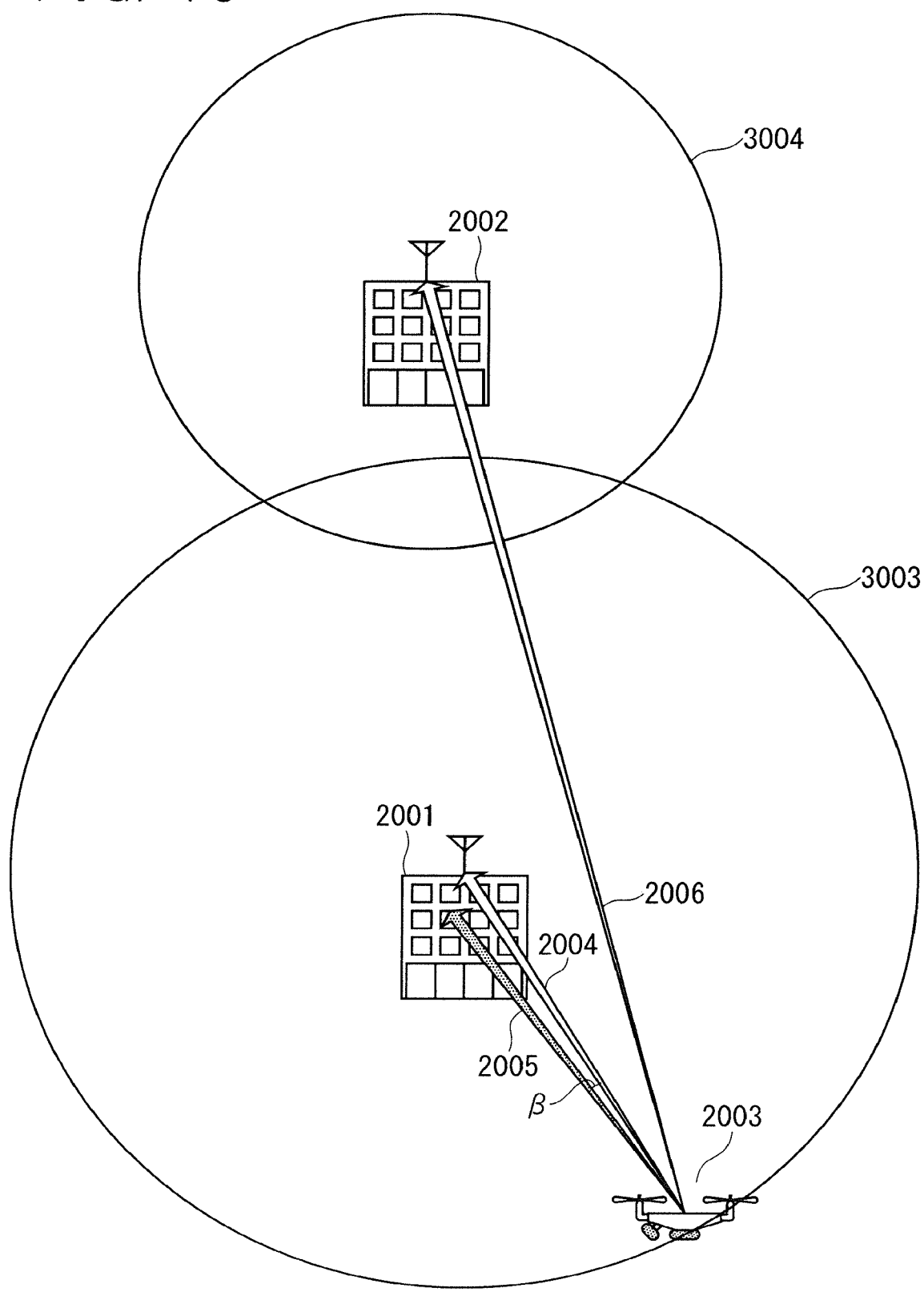
FIG. 13 is a plan view of the respective arrangements in FIG. 12 as viewed from above.

FIG. 13 is a plan view of each arrangement of FIG. 12 viewed from above. In FIG. 13, a cell area 3003 of the base station 2001 and a cell area 3004 of the neighboring base station 2002 are closer to each other as being partially overlapped.

Considering the position of the flying object 2003 (mobile terminal), the altitude of the flying object 2003, the half-value beam width of the flying object 2003 (mobile terminal), and the like, which are measured by the base station 2001, the magnitude of the tilt angle in the horizontal direction of the transmission/reception beam and a direction in which the tilt angle is set is notified from the base station 2001 to the flying object 2003 (mobile terminal) by RRC connection reconfiguration, at the time of registering a position, establishing an individual channel by random access, or establishing an individual channel after handover. With this configuration, the base station 2001 can manage the beam directions of all mobile terminals in the communication apparatus.

In particular, the location information becomes accurate when the location information of the neighboring base station 2002 is notified via a core network corresponding to an S1 interface in 3GPP. This improves the control accuracy of the magnitude of the horizontal tilt angle and the direction in which the tilt angle is set.

Modification 2 of Second Embodiment

In a case where the mobile terminal cannot be equipped with a function, such as APAA, for controlling the directivity of the transmission/reception beam or beam width and a simple dipole antenna or patch antenna is installed, controlling the transmission power is effective as a second method.

Figure 14:
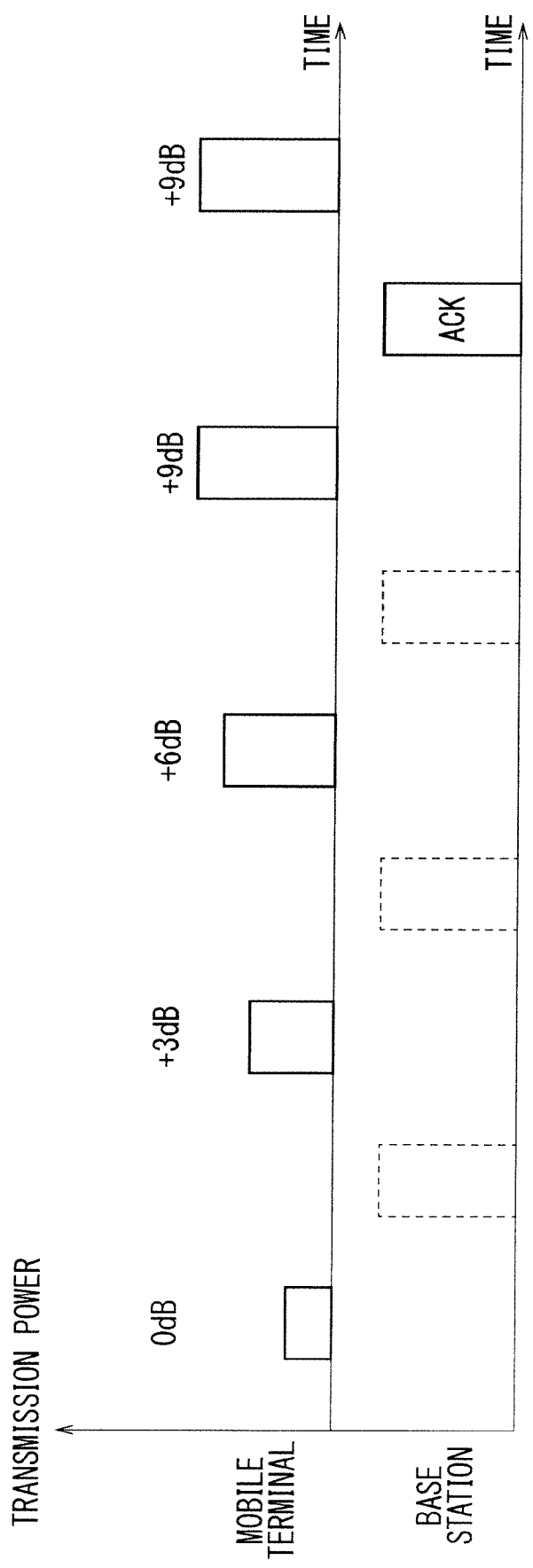
FIG. 14 is a diagram illustrating time transition of transmission power control.

When performing a random access, initially establishing communication, or establishing communication with a different base station by handover, the mobile terminal transmits a synchronization known sequence and gradually increases the transmission power before a respond (ACK) is returned from the base station as an apparatus at the other end. Then, as illustrated in FIGS. 14 and 15, when the response (ACK) is returned, the control for increasing the transmission power is stopped. More specifically, until the response (ACK) is returned from the base station, the transmission power at the mobile terminal is increased to 0 dB, +3 dB, +6 dB, and +9 dB, and the transmission power is fixed when the response (ACK) is returned from the base station. This configuration is effective to find a transmission power that can propagate a signal to the base station and suppress signal interference with other cells as much as possible. Note that FIG. 14 is a diagram illustrating a time transition of the transmission power control, where the vertical axis indicates the transmission power and the horizontal axis indicates the time. Further, FIG. 15 is a diagram illustrating a transition of the transmission power control according to the response from the base station.

In addition, as described above, since there is a possibility that only the mobile terminal provided in the flying object or the mobile terminal that is the flying object itself uses a special transmission power sequence, for example, as in 3GPP, it is effective to transmit information indicating one of or both of whether or not the mobile terminal corresponds to a flying object and whether or not the mobile terminal can perform beam control to the base station as a response to a channel setting request or a change request equivalent to RRC Connection Setup Complete.

In addition, when the mobile terminal provided in the flying object communicates using the frequency of the mobile terminal corresponding to a device other than the flying object, the transmission timing of the mobile terminal corresponding to a device other than the flying object, and the orthogonal code used in the mobile terminal corresponding to a device other than the flying object, frequency utilization efficiency can be improved since the communication can be separated from communication of the mobile terminal corresponding to a device other than the flying object. Such communication may be performed by allocating communication resources in the base station based on UE-capability.

Third Embodiment

A communication apparatus according to the present embodiment will be described. In the following description, the same components as those described in the above described embodiment are denoted by the same reference numerals, and detailed description thereof will be omitted as appropriate.

Hereinafter, an operation in the base station side when the mobile terminal is provided in the flying object or when the flying object itself is the mobile terminal will be described.

In general, in order to reduce interference with other cells, the base station sets the direction of a transmitting beam downward from the horizontal direction. However, when the mobile terminal is equipped with a flying object, or when the flying object itself is a mobile terminal, in an extreme example, the mobile terminal may be located directly above the base station and the mobile terminal cannot be detected even if the base station has a function to control transmission/reception beam directivity such as APAA. Since the beam directivity is not generally directed in an upward direction, it is difficult to detect the mobile terminal at any rate.

Therefore, the base station notifies the neighboring base station of another cell of the information of the flying object equipped with the mobile terminal communicating in its own cell (flying object specification information) via the core network according to the S1 interface in 3GPP or the base station notifies the neighboring base station in another cell by communication between base stations such as Iur in 3GPP W-CDMA.

The information of the flying object may be the presence or absence of the communicating flying object or the number of flying objects. The neighboring base station that has received the notification of the flying object specification information starts transmission/reception of the common channel including the sky or increases the frequency of directing the transmission/reception beam to the sky for the common channel. In other words, the direction of the transmission/reception beam when the notification of the flying object specification information is received is a vertically upward direction than the direction of the transmission/reception beam when the notification of the flying object specification information is not received. With this configuration, detection of the mobile terminal is easier even in the neighboring base stations.

Figure 16:
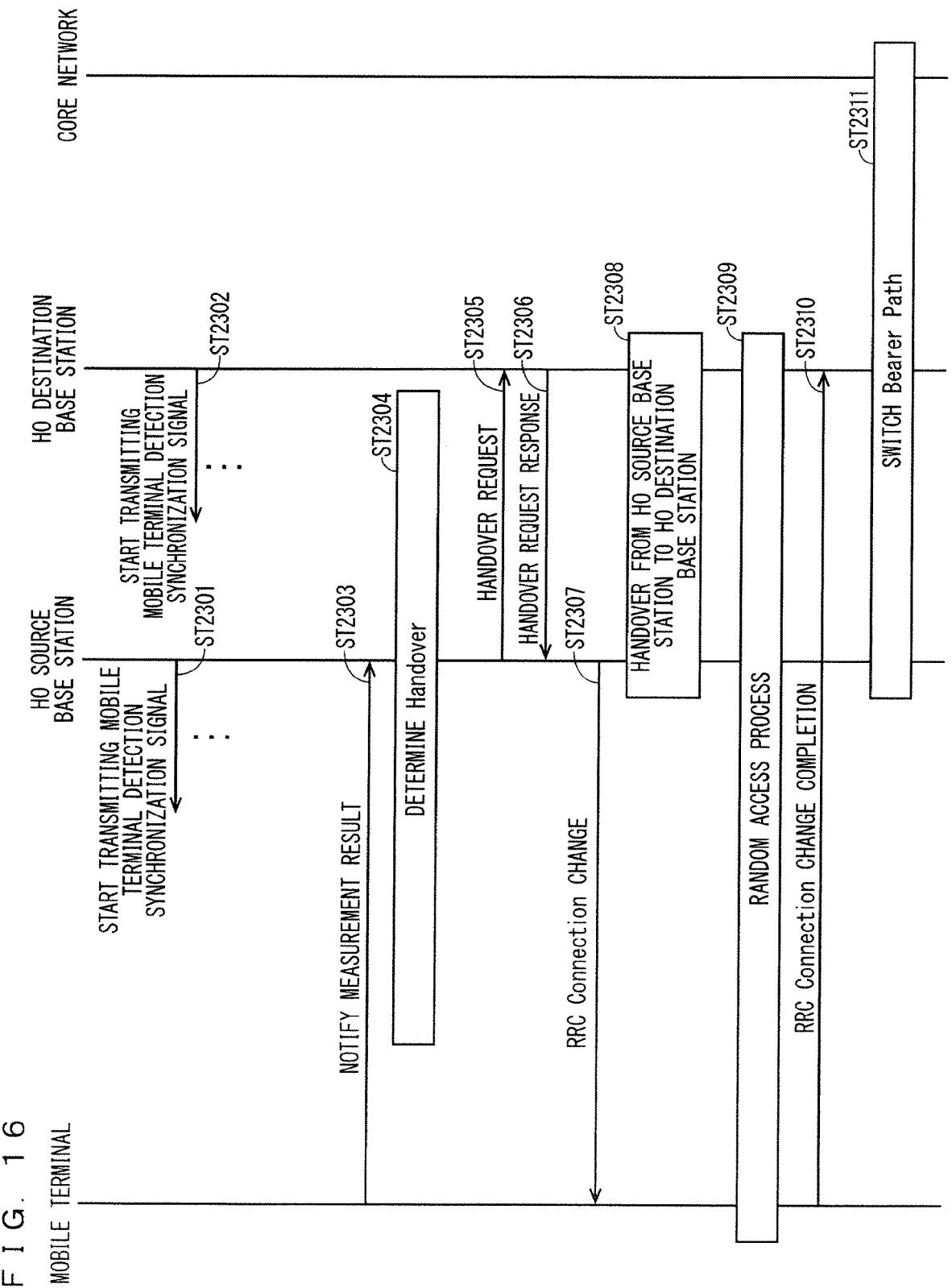
FIG. 16 is a sequence diagram illustrating an operation of the communication apparatus including a handover.

Next, with reference to FIG. 16, handover in a case where the mobile terminal is provided in the flying object, or in a case where the flying object itself is the mobile terminal will be described. FIG. 16 is a sequence diagram illustrating operation including handover in the communication apparatus.

As illustrated in FIG. 16, the sequence itself is the same as normal handover. In step ST2301, a signal for synchronizing the mobile terminal is transmitted from the handover source base station. Next, in step ST2302, a signal for synchronizing the mobile terminal is transmitted from the handover destination base station.

Next, in step ST2303, the result of quality measurement is reported for each beam ID of the handover source base station and the cell listed in the Neighbouring Cell List, and at the same time, information corresponding to distance to a target cell is reported. The information corresponding to the distance may be information from various geodetic systems of the terminal such as WGS84 obtained from GPS and the like, or may be time information that indicates when the synchronization signal transmitted from the base station has arrived at the GPS reference time.

In Step ST2304, the handover source base station determines the handover in consideration of distance between the base station and the mobile terminal in addition to communication quality. In particular, even when the communication quality between the handover source base station and the mobile terminal is good in prospect, the mobile terminal performs handover to a handover destination base station in a case where the distance between the handover destination base station in another cell and the mobile terminal is shorter than the distance between the handover source base station and the mobile terminal. When the mobile terminal is a flying object, a wave that causes a significant interference with the adjacent base station or the next adjacent base station may be generated since signals are propagated farther. Therefore, handover is performed based on the distance between the base station and the mobile terminal.

Note that it is preferable to perform the handover when the following Equation (5) is satisfied so that the handover is not repeated between the handover destination base station and the handover source base station.

[Equation 5]

Distance to handover source base station−Distance to handover destination base station>Δ(Hysteresis)   (5)

Here, Δ may be adjusted based on OAM as a system parameter.

Next, in step ST2305, the handover source base station sends a handover request to the handover destination base station. Next, in step ST2306, the handover destination base station makes a response corresponding to the handover request to the handover source base station.

Next, in step ST2307, the handover source base station issues, to the mobile terminal, an instruction to change the connection destination of the RRC connection.

Next, in step ST2308, data is transferred from the handover source base station to the handover destination base station (Data-forwarding).

Next, in step ST2309, the mobile terminal, the handover source base station, and the handover destination base station perform random access processing.

Next, in step ST2310, the mobile terminal notifies the completion of changing to the handover destination base station.

Next, in step ST2311, the handover source base station, the handover destination base station, and the core network perform bearer path switching.

Here, when the mobile terminal is provided in the flying object, or when the flying object itself is the mobile terminal, it is efficient that the base station monitors a right side, a left side, above and bottom of the flying object to properly set the beam direction corresponding to the movement of the flying object, without continuously monitoring the whole sky at the same frequency.

Further, in a case of assuming that the base station size of the handover source base station (for example, a transmission power value of a broadcast channel or a common channel) and the base station size of the handover destination base station (for example, the transmission power value of the broadcast channel or the common channel) are same, when the distance between the handover destination base station and the mobile terminal is shorter than the distance between the handover source base station and the mobile terminal, the above operation that the mobile terminal performs handover to a handover destination base station is not limited to a case of the mobile terminal corresponding to a flying object but can be applied, in a similar manner, to a case where at least one of the handover source base station, the mobile terminal, and the handover destination base station is a flying object.

In a case where the base station size of the handover source base station and the base station size f the handover destination base station are different, their base station boundary is a border of the two base stations where quality of the transmission signals of the broadcast channel or common channel signal to interference noise ratio (SINR) becomes equivalent; however, the boundary cannot be determined in a case of a flying object since both qualities are extremely good. Therefore, for example, handover can be performed when the base station boundary is calculated based on a broadcast information transmission power value included in the broadcast information of each base station and the distance is reached.

Further, when the distance between the handover destination base station and the mobile terminal is shorter than the distance between the handover source base station and the mobile terminal, the above operation that the mobile terminal performs handover to a handover destination base station is not limited to a case of the mobile terminal corresponding to a flying object but can be applied, in a similar manner, to a case where at least one of the handover source base station, the mobile terminal, and the handover destination base station is a flying object.

Figure 17:
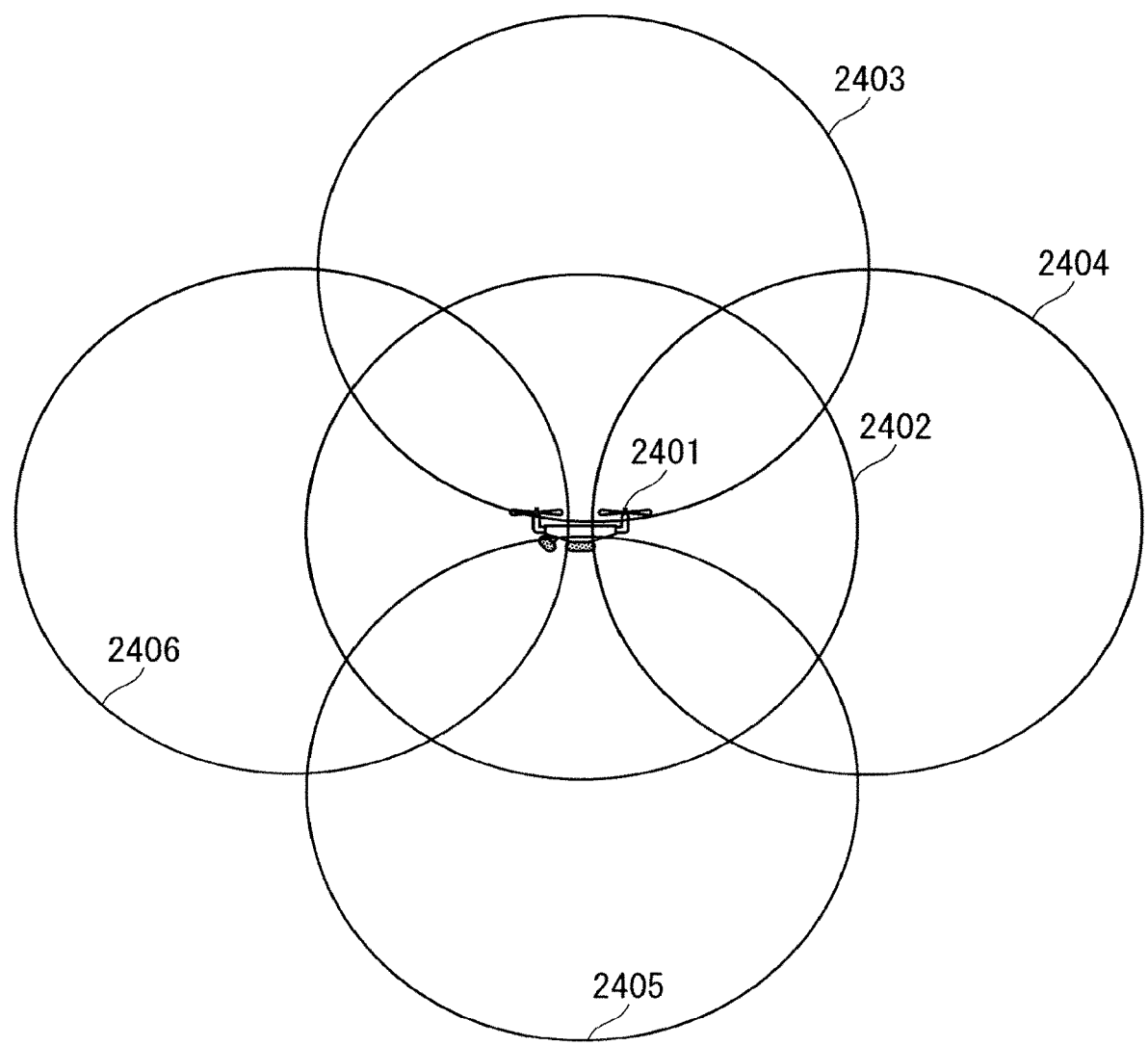
FIG. 17 is a diagram illustrating a beam range of the flying object.

FIG. 17 is a diagram illustrating the beam range of the flying object. In FIG. 17, a flying object 2401 including a mobile terminal is communicating in a beam range 2402.

In this case, considering that the flying object 2401 moves, it can be confirmed whether or not the current beam range 2402 corresponds to an optimum beam direction by intentionally directing the beam to a range in a beam range 2403, a beam range 2404, a beam range 2405, and a beam range 2406, which are deviated from the beam range 2402. Then, when it is determined that the beam direction is not optimal, the beam direction can be corrected.

Fourth Embodiment

A communication apparatus according to the present embodiment will be described. In the following description, the same components as those described in the above described embodiment are denoted by the same reference numerals, and detailed description thereof will be omitted as appropriate.

Hereinafter, a mobile terminal applied to the respective embodiments described above will be described with reference to FIG. 18. Here, FIG. 18 is a functional block diagram conceptually illustrating a configuration of the mobile terminal.

As illustrated in FIG. 18, the mobile terminal includes a digital signal processing unit 2501, a transmission/reception unit 2502, a switch unit 2503, a horizontal antenna 2504, a downward antenna 2505, and a control/monitor unit 2506.

The horizontal antenna 2504 having directivity of a transmission/reception beam in the horizontal direction includes at least a sector antenna 25041, a sector antenna 25042, and a sector antenna 25043. The number of sector antennas is not limited to those illustrated in the figure.

The downward antenna 2505 having directivity of transmission/reception beams in the downward direction includes at least s phase shifter 25051, a sector antenna 25052 connected to the phase shifter 25051, a phase shifter 25053, a sector antenna 25054 connected to the phase shifter 25053, a phase shifter 25055, and a sector antenna 25056 connected to the phase shifter 25055. Note that the number of phase shifters and the number of sector antennas are not limited to those illustrated in the figure.

The switch unit 2503 switches between the horizontal antenna 2504 and the downward antenna 2505.

The transmission/reception signal generated in the digital signal processing unit 2501 is up-converted or down-converted with a radio signal in the transmission/reception unit 2502. The switch unit 2503 switches the signal processed by the transmission/reception unit 2502.

As a result, signals can be transmitted by selecting an appropriate antenna from many antennas with only a small number of digital signal processing units 2501 and transmission/reception units 2502. In particular, it is desirable that the downward antenna 2505 having the directivity of the transmission/reception beam in the downward direction has a configuration capable of changing the directivity of the transmission/reception beam by digital control.

In the configuration illustrated in FIG. 18, the control/monitor unit 2506 digitally controls the phase shifter 25051, the phase shifter 25053, and the phase shifter 25055 by controlling their phases.

Note that the downward antenna 2505 is desirably configured to synthesize the plurality of sector antennas 25052, sector antennas 25054, and sector antennas 25056, and by arranging them linearly, the directivity of the transmission/reception beam can be changed only in the linear direction.

Next, the configuration of the mobile terminal will be described with reference to FIG. 19. Here, FIG. 19 is a diagram schematically illustrating a hardware configuration of the mobile terminal.

Figure 19:
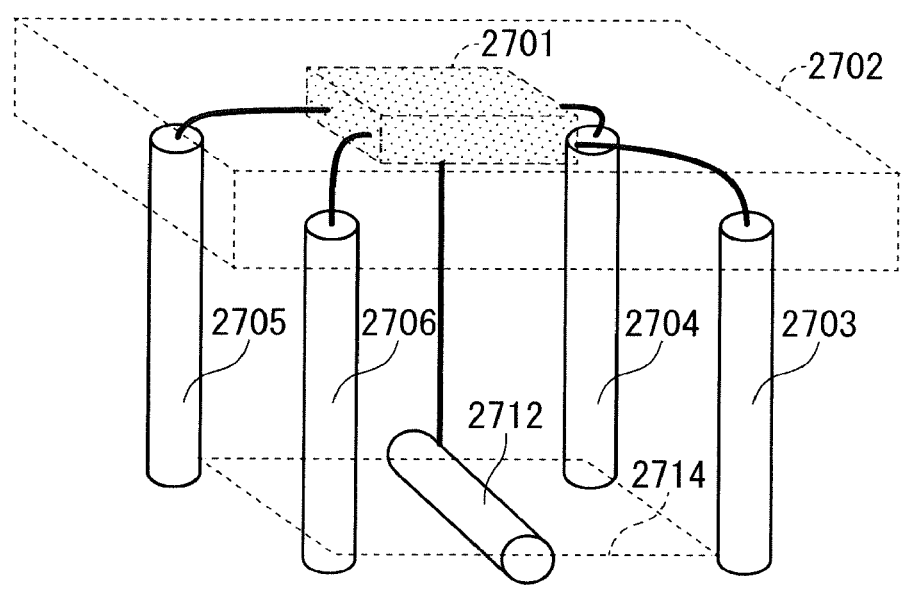
FIG. 19 is a diagram schematically illustrating a hardware configuration of the mobile terminal.

As illustrated in FIG. 19, the mobile terminal includes a communicator box 2701, a sector antenna 2703, a sector antenna 2704, a sector antenna 2705, a sector antenna 2706, and an antenna 2712. In FIG. 19, a casing 2702 of the flying object and a support 2714 for fixing radomes of the antennas are illustrated by the dotted lines.

The communicator box 2701 accommodates the digital signal processing unit 2501, the transmission/reception unit 2502, and the switch unit 2503 illustrated in FIG. 18.

The sector antenna 2703, sector antenna 2704, sector antenna 2705, and sector antenna 2706 are respectively housed in the radome and have different directivity of the transmission/reception beams. These four sector antennas cover directions in 360°. In other words, each sector antenna can transmit and receive a transmission/reception beam having directivity of 90° in the outward direction from the center of the flying object.

The antenna 2712 is an antenna having the directivity of the transmission/reception beam in the downward direction. When a plurality of antennas 2712 having directivity of a downward transmission/reception beam are provided in the longitudinal direction in the radome, this forms a configuration that the directivity of the transmission/reception beam can be controlled in the longitudinal direction.

Next, operation of the mobile terminal will be described.

The digital signal processing unit 2501 performs L2 processing such as sequence control, automatic retransmission request (ARQ), and the like, and L1 processing for converting to a radio format such as error correction processing, interleaving, multilevel modulation, or the like The transmission/reception unit 2502 converts the output from the digital signal processing unit 2501 into an analog signal. Then, the transmission/reception unit 2502 upconverts the signal to the frequency of the carrier wave. The switch unit 2503 selects to which antenna the output from the transmission/reception unit 2502 is output.

The switch unit 2503 sequentially switches the downward antenna 2505, the sector antenna 25041, the sector antenna 25042, and the sector antenna 25043, and selects an antenna that maximizes the received electric field strength of PSS and SSS of the base station. Then, the switch unit 2503 radiates a required signal to the selected antenna.

When the base station is located almost immediately below, the downward antenna 2505 is selected. For example, when a flying object equipped with the mobile terminal is several hundred meters away from the base station and is flying at an altitude of about 50 m, the base station is viewed in an almost horizontal direction. Therefore, any one of sector antenna 25041, sector antenna 25042, and sector antenna 25043 is selected.

In the above case, since the downward antenna 2505 can change the directivity of the transmission/reception beam, the received electric field strength of PSS and SSS is sequentially measured by adjusting the phase shifter by digital control by the control/monitor unit 2506 and changing the directivity of the transmission/reception beam.

Note that, in a case where the sector antenna 25052, sector antenna 25054, and sector antenna 25056 in the downward antenna 2505 are, for example, beams with a half-value width of about 30°, it is desirable to measure the electric field strength while sequentially rotating the flying object itself since the directivity of the transmission/reception beam can be changed only in the longitudinal direction of the antenna. However, the flying object is not rotated during the measurement of the electric field strength.

In addition, FIG. 18 illustrates the configuration in which one transmission/reception unit 2502 is provided; however, a plurality of transmission/reception units may be provided considering a case where the mobile terminal performs tethering or D2D (communication between mobile terminals), considering convenience in monitoring more than one base stations at the same time, or considering convenience in configuration of the mobile terminal.

Figure 20:
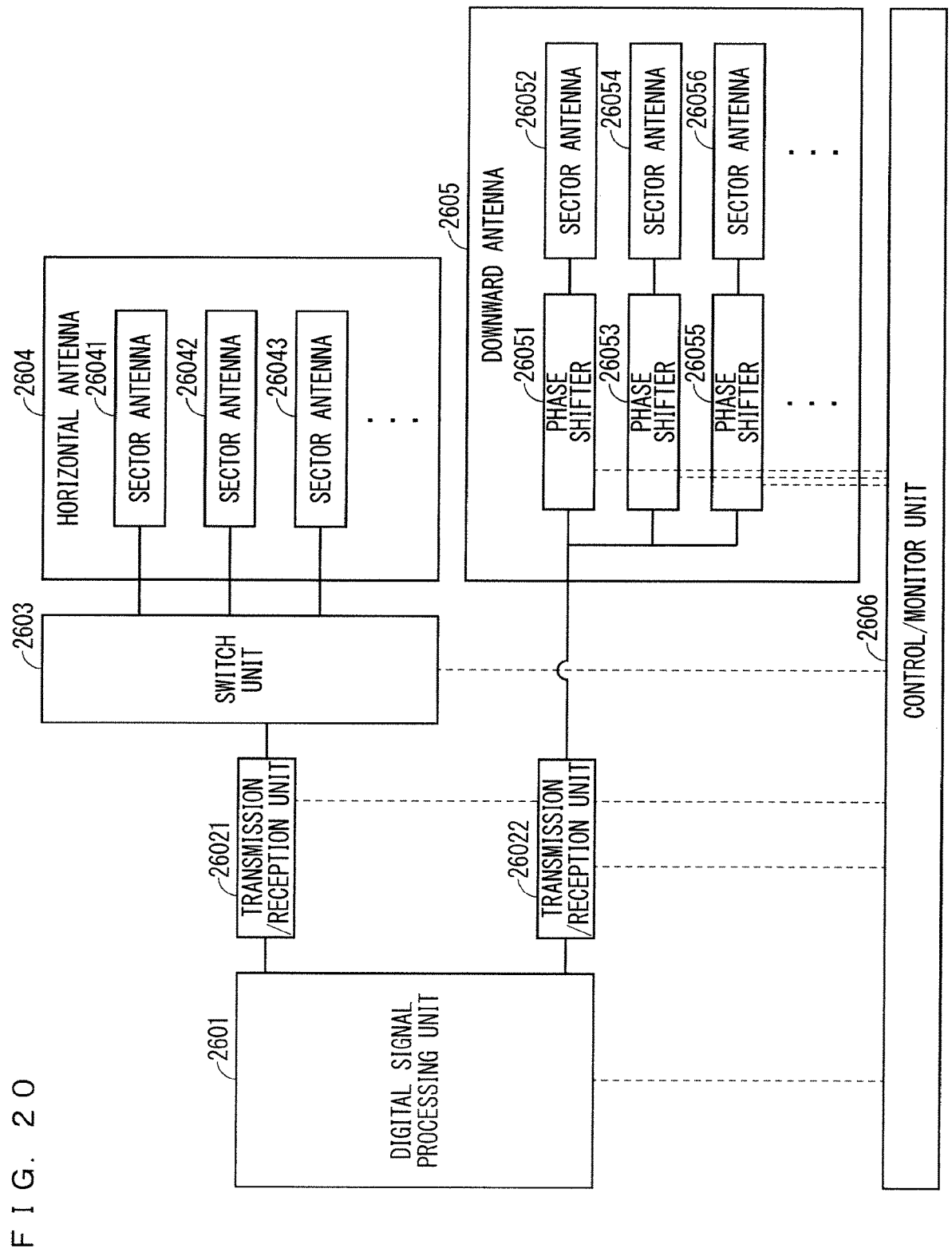
FIG. 20 is a functional block diagram conceptually illustrating the configuration of the mobile terminal including a plurality of transmission/reception units.

FIG. 20 is a functional block diagram conceptually illustrating a configuration of a mobile terminal including a plurality of transmission/reception units.

As illustrated in FIG. 20, the mobile terminal includes a digital signal processing unit 2601, a transmission/reception unit 26021, a transmission/reception unit 26022, a switch unit 2603, a horizontal antenna 2604, a downward antenna 2605, and a control/monitor unit 2606.

The horizontal antenna 2604 having the directivity of the transmission/reception beam in the horizontal direction includes at least a sector antenna 26041, a sector antenna 26042, and a sector antenna 26043. The number of sector antennas is not limited to those illustrated in the figure.

The downward antenna 2605 having directivity of transmission/reception beams in the downward direction includes at least a phase shifter 26051, a sector antenna 26052 connected to the phase shifter 26051, a phase shifter 26053, a sector antenna 26054 connected to the phase shifter 26053, a phase shifter 26055, and a sector antenna 26056 connected to the phase shifter 26055. Note that the number of phase shifters and the number of sector antennas are not limited to those illustrated in the figure.

The switch unit 2603 switches the sector antenna in the horizontal antenna 2504.

Although an example of the configuration of the mobile terminal has been described above, a case where a repeater that repeats a signal received by a radio signal using a radio signal is a flying object may be provided in a similar manner.

<Effects Produced by the Above Described Embodiments>

Next, the effects produced by the above described embodiments are illustrated. Note that, in the following description, although the effect is described based on the specific configuration exemplified in the embodiments described above, some configurations may be replaced with another specific configuration described in the present specification within a range that the same effect is obtained.

Also, the replacement may be performed across the multiple embodiments. In other words, the respective configurations illustrated in different embodiments may be combined to produce the similar effects.

According to the above described embodiment, the communication apparatus includes the first base station, the flying object 1105 equipped with the second base station, and the mobile terminal 1106 communicating with the second base station. Here, the first base station corresponds to at least one of the MeNB 1102 and neighboring base station 1507. Further, the second base station corresponds to at least one of the SeNB and a base station (MeNB+SeNB). Further, the flying object corresponds to at least one of the flying object 1105 and flying object 1505. In addition, the mobile terminal corresponds to at least one of the mobile terminal 1106 and mobile terminal 1506. The flying object 1105 is equipped with an SeNB. The mobile terminal 1106 communicates with the SeNB. The MeNB 1102 notifies flying object specification information which is information indicating that an SeNB is mounted in the flying object 1105. Then, when the flying object specification information is received, the mobile terminal 1106 sets the beam direction for detecting the SeNB to the second direction which is upward compared to the first direction that is the direction of the beam when the flying object specification information is not received.

According to such a configuration, even when the SeNB is provided in the flying object 1105 in a direction with a large elevation angle, more specifically, in the sky or the like, the SeNB detection beam directivity 11061 of the mobile terminal 1106 can be changed upward based on the flying object specification information included in the broadcast information 11021. Therefore, the mobile terminal 1106 can detect even the base station provided in the flying object 1105.

Note that, another configuration described in this specification other than the above configuration can be omitted as appropriate. That is, with at least these configurations, the above described effects can be produced.

However, similar effects can be produced even when at least one or more of the other configurations described in this specification is appropriately added to the above described configuration, that is even when another configuration which is not described as a configuration in this specification is added as appropriate.

Moreover, according to the above described embodiments, the MeNB 1102 communicates with the SeNB included in the flying object 1105 in a cell to which the SeNB belongs. According to such a configuration, even when the flying object 1105 is equipped with the SeNB, the SeNB detection beam directivity 11061 of the mobile terminal 1106 can be changed upward based on the flying object specification information included in the broadcast information 11021 notified from the MeNB 1102.

Further, according to the above described embodiments, the neighboring base station 1507 belongs to a cell different from the cell to which the base station (MeNB+SeNB) included in the flying object 1505 belongs. According to such a configuration, even if the flying object 1505 is provided with the MeNB and SeNB, the base station detection beam directivity 15061 of the mobile terminal 1506 can be changed upward based on the flying object specification information included in the broadcast information 15021 notified from the neighboring base station 1507.

Further, according to the above described embodiment, the flying object specification information includes information on the moving speed of the flying object 1105. According to such a configuration, even when the mobile terminal 1106 is stationary, the base station detection process can be performed in consideration of the possibility of a Doppler shift occurring due to the movement of the flying object.

Further, according to the above described embodiment, the flying object specification information includes information on the movement path of the flying object 1105. According to such a configuration, a base station can be searched in accordance with the timing at which the transmission/reception beam of the mobile terminal 1106 is directed toward the flying object 1105.

Further, according to the above described embodiment, the flying object specification information includes the altitude information of the flying object 1105. According to such a configuration, cell search can be performed in a short time, particularly when information on various geodetic systems such as WGS84 obtained from GPS or the like is added to the Neighbouring Cell List. At the same time, when APAA is used in the mobile terminal 1106, a half-value beam width or transmission power can be adjusted based on the altitude information of the flying object 1105 including the SeNB. Therefore, interference caused by transmission/reception beams to other cells can be reduced.

Further, according to the above described embodiment, the communication apparatus includes the first base station and the flying object 1805 corresponding to the mobile terminal (including the mobile terminal or the mobile terminal itself). Here, the first base station corresponds to the base station 1802 (MeNB+SeNB). The mobile terminal corresponding to the flying object 1805 communicates with the base station 1802 (MeNB+SeNB). The mobile terminal sets the direction of the transmission/reception beam for communicating with the base station 1802 (MeNB+SeNB) to a direction shifted by the tilt angle (for example, vertically downward) from the direction toward the base station 1802 (MeNB+SeNB).

According to such a configuration, since the propagation distance of the signal is shortened, transmission power from the flying object 1805 can be suppressed from being transmitted outside the cell area. Therefore, signal interference to other cells caused by the mobile terminal corresponding to the flying object 1805 can be suppressed.

Further, according to the above described embodiment, the tilt angle is set according to the half-value width of the transmission/reception beam. According to such a configuration, when the half-value beam width is large, an unnecessary transmission/reception beam causes signal interference with other cells and, therefore, when the half-value beam width is large, the tilt angle can be made larger.

Further, according to the above described embodiment, the tilt angle is set according to the altitude of the flying object 1805. According to such a configuration, if the altitude of the flying object 1805 is high, unnecessary transmission/reception beams may cause signal interference with other cells and, therefore, when the altitude of the flying object 1805 is high, the tilt angle can be made larger.

Further, according to the above described embodiment, the tilt angle is set smaller as the response time from the base station 1802 (MeNB+SeNB) is longer in communication between the base station 1802 (MeNB+SeNB) and the mobile terminal. According to such a configuration, the degree of suppression is gradually reduced from the state in which signal propagation from the flying object 1805 corresponding to the mobile terminal is suppressed to the base station 1802, since a tilt angle at which a signal is propagated from the mobile terminal to the base station 1802 for the first time can be found and this helps to find a tilt angle at which signals can be propagated from the mobile terminal to the base station 1802 and at which signal interference to other cells can be suppressed as much as possible.

Further, according to the above described embodiment, the communication apparatus includes the first base station and the flying object (including the mobile terminal or the mobile terminal itself) corresponding to the mobile terminal. The mobile terminal corresponding to the flying object communicates with the first base station. In the communication with the first base station, the mobile terminal increases the transmission power for the communication as the response time of the first base station that is the apparatus at the other end is longer.

According to such a configuration, transmission power is gradually increased from a state in which signal propagation from the flying object corresponding to the mobile terminal to the base station is difficult, since transmission power at which a signal is propagated from the mobile terminal to the base station for the first time can be found and this helps to find transmission power at which a signals can be propagated from the mobile terminal to the base station and at which signal interference to other cells can be suppressed as much as possible.

Further, according to the above described embodiment, the communication apparatus includes the second base station that belongs to a different cell from that of the first base station. Here, the second base station corresponds to a neighboring base station of another cell. The neighboring base station notifies flying object specification information that is information indicating that the mobile terminal corresponds to the flying object. When the flying object specification information is received, the first base station sets the transmission/reception beam direction for communicating with the mobile terminal to the second direction which is upward compared to the first direction that is the direction of the beam when the flying object specification information is not received. According to such a configuration, even when the flying object located in a direction with a large elevation angle, that is, more specifically in the sky or the like, corresponds to a mobile terminal, the neighboring base station can set the direction of the transmission/reception beam upward or increase frequency of setting the direction of the transmission/reception beam upward, based on the flying object specification information notified from the base station including a flying object in its own cell. Therefore, the detection of the mobile terminal becomes easier even in a neighboring base station located around the cell having the flying object.

Further, according to the above described embodiment, the communication apparatus includes the first base station, the mobile terminal, and the second base station of another cell. Here, the first base station corresponds to a handover source base station. The second base station corresponds to a handover destination base station. The mobile terminal communicates with the handover source base station in the cell to which the handover source base station belongs. At least one of the handover source base station, the mobile terminal, and the handover destination base station corresponds to the flying object. Then, based on at least the distance to the handover source base station and the distance to the handover destination base station, the mobile terminal performs the handover from the handover source base station to the handover destination base station.

According to such a configuration, since handover is performed based on the distance between the base station and the mobile terminal, when at least one of the handover source base station, the mobile terminal, and the handover destination base station is a flying object, the interference wave to the adjacent base station or the next adjacent base station can be reduced due to the signal propagating to farther distance.

Modifications of the Above Described Embodiments

In the embodiments described above, the dimensions, shapes, relative arrangement relations, implementation conditions, and the like of each component may be described; however, these are examples in all aspects, and it is not limited to those described in this specification.

Accordingly, numerous modifications and unillustrated equivalents are contemplated within the scope of the technology disclosed herein. For example, a case of modifying at least one component, a case of adding or omitting a component, and further a case of extracting at least one component in at least one embodiment and combining the component with a component of another embodiment are included.

In addition, unless there is a contradiction, "one or more" may be included as a component described as "one" in the embodiments described above.

Furthermore, each component in the embodiments described above is a conceptual unit, and the scope of the technology disclosed in the present specification includes a case where one component is composed of a plurality of structures, a case where one component corresponds to a part of a structure, and a case where a plurality of components are provided in one structure.

Further, each component in the above described embodiment may include a structure having another configuration or shape as long as the same function is provided.

In addition, the description in the present specification should be referred to for all purposes related to the present technology, and none should be recognized as conventional art.

EXPLANATION OF REFERENCE SIGNS

1001, 1101, 1401, 1501, 1801: Core network
1002, 1102: MeNB
1003, 1403: Ground station
1004, 1404: Artificial satellite
1005, 1105, 1405, 1505, 1805, 2003, 2401: Flying object
1006, 1106, 1406, 1506: Mobile terminal
1507, 2002: Neighbouring base station
1802, 2001: Base station
2004, 2005, 2006, 3001, 3002: Direction
2007, 2008, 2402, 2403, 2404, 2405, 2406: Beam range
2501, 2601: Digital signal processing unit
2502, 26021, 26022: Transmission/reception unit
2503, 2603: Switch unit
2504, 2604: Horizontal antenna
2505, 2605: Downward antenna
2506, 2606: Control/monitor unit
2701: Communicator box
2702: Case
2703, 2704, 2705, 2706, 25041, 25042, 25043, 25052, 25054, 25056, 26041, 26042, 26043, 26052, 26054, 26056: Sector antenna
2712: Antenna
2714: Support
3003, 3004: Cell area
11021, 15021: Broadcast information
11061: SeNB detection beam directivity
15061: Base station detection beam directivity
25051, 25053, 25055, 26051, 26053, 26055: Phase shifter

The invention claimed is:
1. A communication apparatus comprising:
a first base station;
a flying object including a second base station; and
a mobile terminal to communicate with the second base station, wherein the first base station notifies flying object specification information that is information indicating that the second base station is included in the flying object, and when the flying object specification information is received, the mobile terminal sets a direction of a beam for detecting the second base station to a second direction that is a direction vertically upward compared to a first direction that is the direction of the beam in a case where the flying object specification information is not received.

2. The communication apparatus according to claim 1, wherein the first base station communicates with the second base station in a cell to which the second base station belongs.

3. The communication apparatus according to claim 1, wherein the first base station belongs to a cell that is different from a cell to which the second base station belongs.

4. The communication apparatus according to claim 1, wherein the flying object specification information includes information on a moving speed of the flying object.

5. The communication apparatus according to claim 1, wherein the flying object specification information includes information on a moving path of the flying object.

6. The communication apparatus according to claim 1, wherein the flying object specification information includes information on altitude of the flying object.

\* \* \* \* \*